(12) United States Patent
Zhu et al.

(10) Patent No.: US 11,227,364 B2
(45) Date of Patent: Jan. 18, 2022

(54) COMPUTER-IMPLEMENTED METHOD USING CONVOLUTIONAL NEURAL NETWORK, APPARATUS FOR GENERATING COMPOSITE IMAGE, AND COMPUTER-PROGRAM PRODUCT

(71) Applicant: BOE Technology Group Co., Ltd., Beijing (CN)

(72) Inventors: Dan Zhu, Beijing (CN); Pablo Navarrete Michelini, Beijing (CN); Lijie Zhang, Beijing (CN); Hanwen Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 245 days.

(21) Appl. No.: 16/613,073

(22) PCT Filed: May 17, 2019

(86) PCT No.: PCT/CN2019/087447
§ 371 (c)(1),
(2) Date: Nov. 12, 2019

(87) PCT Pub. No.: WO2020/062894
PCT Pub. Date: Apr. 2, 2020

(65) Prior Publication Data
US 2021/0358082 A1    Nov. 18, 2021

(30) Foreign Application Priority Data
Sep. 25, 2018  (CN) .......................... 201811118522.6

(51) Int. Cl.
*G06T 3/40*    (2006.01)
*G06K 9/62*    (2006.01)
*G06N 3/08*    (2006.01)

(52) U.S. Cl.
CPC .......... *G06T 3/4046* (2013.01); *G06K 9/6232* (2013.01); *G06N 3/08* (2013.01)

(58) Field of Classification Search
CPC ....... G06T 3/4046; G06K 9/6232; G06N 3/08
See application file for complete search history.

(56) References Cited

U.S. PATENT DOCUMENTS 9,633,660 B2 *  4/2017  Haughay ................. G10L 17/08
9,922,432 B1 *  3/2018  Risser ..................... G06T 11/00
(Continued)

FOREIGN PATENT DOCUMENTS

CN   106709532 A   5/2017
CN   106960243 A   7/2017
(Continued)

OTHER PUBLICATIONS

International Search Report & Written Opinion dated Aug. 19, 2019, regarding PCT/CN2019/087447.
(Continued)

*Primary Examiner* — Qun Shen
(74) *Attorney, Agent, or Firm* — Intellectual Valley Law, P.C.

(57) ABSTRACT

A computer-implemented method using a convolutional neural network is provided. The computer-implemented method includes processing an input image through the convolutional neural network to generate an output image including content features of the input image morphed with style features of a style image. The convolutional neural network includes a feature extraction sub-network, a morpher, and a decoder sub-network. Processing the input image through convolutional neural network includes extracting style features of the style image to generate a plurality of style feature maps using the feature extraction sub-network; extracting content features of the input image to generate a (Continued)

plurality of content feature maps using the feature extraction sub-network; morphing the plurality of content feature maps respectively with the plurality of style feature maps to generate a plurality of output feature maps using the morpher; and reconstructing the plurality of output feature maps through the decoder sub-network to generate the output image.

20 Claims, 12 Drawing Sheets

(56) References Cited

U.S. PATENT DOCUMENTS

| | | | | |
|---|---|---|---|---|
| 10,007,863 | B1* | 6/2018 | Pereira | G06K 9/6267 |
| 10,446,143 | B2* | 10/2019 | Akbacak | G10L 15/08 |
| 10,664,999 | B2* | 5/2020 | Gupta | G06N 3/0454 |
| 2016/0259994 | A1 | 9/2016 | Ravindran et al. | |
| 2018/0211157 | A1 | 7/2018 | Liu et al. | |
| 2019/0035149 | A1* | 1/2019 | Chen | G06T 7/50 |
| 2019/0273510 | A1* | 9/2019 | Elkind | G06F 8/74 |
| 2019/0304067 | A1* | 10/2019 | Vogels | G06F 17/18 |

FOREIGN PATENT DOCUMENTS

| | | |
|---|---|---|
| CN | 107767328 A | 3/2018 |
| CN | 108470320 A | 8/2018 |
| EP | 3147799 A1 | 3/2017 |

OTHER PUBLICATIONS

First Office Action in the Chinese Patent Application No. 201811118522.6, dated Feb. 3, 2020; English translation attached.

Xun Huang et al., "Arbitrary Style Transfer in Real-time with Adaptive Instance Normalization", 2017 IEEE International Conference on Computer Vision, ArCir:1703.06868v2 [cs.CV] Jul. 30, 2017.

Xintao Wang et al., "ESRGAN: Enhances Super-Resolution Generative Adversarial Networks", arXiv: 1809.00219v2 [cs.CV] Sep. 17, 2018.

Ron Kimmel et al., "A Variational Framework for Retinex", International Journal of Computer Vision 52(1), 7-23, 2003.

Justin Johnson et al., "Perceptual Losses for Real-Time Style Transfer and Super-Resolution", arXiv: 1603.08155v1 [cs.CV] Mar. 27, 2016.

Leon A. Gatys et al., "A Neural Algorithm of Artistic Style", arXiv:1508.06576v2 [cs.CV] Sep. 2, 2015.

Prisma (app), Wikipedia, https://en/wikipedia.org/wiki/Prisma_(app).

* cited by examiner

COMPUTER-IMPLEMENTED METHOD USING CONVOLUTIONAL NEURAL NETWORK, APPARATUS FOR GENERATING COMPOSITE IMAGE, AND COMPUTER-PROGRAM PRODUCT

CROSS-REFERENCE TO RELATED APPLICATION

This application is a national stage application under 35 U.S.C. § 371 of International Application No. PCT/CN2019/087447, filed May 17, 2019, which claims priority to Chinese Patent Application No. 201811118522.6, filed Sep. 25, 2018. Each of the forgoing applications is herein incorporated by reference in its entirety for all purposes.

TECHNICAL FIELD

The present invention relates to display technology, more particularly, to a computer-implemented method using a convolutional neural network, an apparatus for generating a composite image, and a computer-program product.

BACKGROUND

In present, deep learning based on artificial neural networks achieves great progresses in fields including item classification, text processing, engineer recommendation, image searching, facial recognition, age recognition, and voice recognition, human-machine dialogue, etc. For example, the deep learning technology can be used to describe contents of an image, to recognize an object from a complicated background in an image, and to recognize a voice in a noisy circumstance. Moreover, the deep learning technology can generate and morph images.

SUMMARY

In one aspect, the present invention provides a computer-implemented method using a convolutional neural network, comprising processing an input image through the convolutional neural network to generate an output image comprising content features of the input image morphed with style features of a style image, wherein the convolutional neural network comprises a feature extraction sub-network, a morpher, and a decoder sub-network; wherein processing the input image through the convolutional neural network comprises extracting style features of the style image to generate a plurality of style feature maps using the feature extraction sub-network; extracting content features of the input image to generate a plurality of content feature maps using the feature extraction sub-network; morphing the plurality of content feature maps respectively with the plurality of style feature maps to generate a plurality of output feature maps using the morpher; and reconstructing the plurality of output feature maps through the decoder sub-network to generate the output image; wherein reconstructing the plurality of output feature maps through the decoder sub-network comprises processing the plurality of output feature maps through an M numbers of densely connected computational modules sequentially connected in the decoder sub-network, a respective one of the M numbers of densely connected computational modules comprising an N numbers of convolutional blocks sequentially connected, M being an integer ≥1, N being an integer ≥2; groups of output feature maps respectively from any previous convolutional blocks of the N numbers of convolutional blocks in the respective one of the M numbers of densely connected computational modules are input into an n-th convolutional blocks of the N numbers of convolutional blocks in the respective one of the M numbers of densely connected computational modules to generate an n-th group of output feature maps, 2≤n≤N; and an output from an m-th densely connected computational module of the M numbers of densely connected computational modules comprises N numbers of groups of output feature maps respectively from the N numbers of convolutional blocks of the m-th densely connected computational module, 1≤m≤M.

Optionally, a respective one of the N numbers of convolutional blocks comprises a convolutional layer and an active layer.

Optionally, the decoder sub-network further comprises a plurality of un-pooling blocks; and a respective one of the plurality of un-pooling blocks comprises: a convolutional layer; an active layer; and an un-pooling layer for performing an up-sampling operation.

Optionally, the feature extraction sub-network comprises a plurality of pooling blocks respectively corresponding to the plurality of un-pooling blocks of the decoder sub-network.

Optionally, the decoder sub-network further comprises an output layer; the M numbers of densely connected computational modules comprise a first densely connected computational module, a second densely connected computational module, and a third densely connected computational module; the plurality of un-pooling blocks comprises a first un-pooling block, a second un-pooling block, and a third un-pooling block; wherein reconstructing the plurality of output feature maps through the decoder sub-network comprises processing the plurality of output feature maps through the first un-pooling block to generate a plurality of first un-pooling feature maps; extracting features of the plurality of first un-pooling feature maps using the first densely connected computational module to generate a plurality of first intermediate decoded feature maps; processing the plurality of first intermediate decoded feature maps through the second un-pooling block to generate a plurality of second un-pooling feature maps; extracting features of the plurality of second un-pooling feature maps using the second densely connected computational module to generate a plurality of second intermediate decoded feature maps; processing the plurality of second intermediate decoded feature maps through the third un-pooling block to generate a plurality of third un-pooling feature maps; extracting features of the plurality of third un-pooling feature maps using the third densely connected computational module to generate a plurality of third intermediate decoded feature maps; and converting the plurality of third intermediate decoded feature maps from a feature space into an image space using the output layer, thereby generating the output image.

Optionally, the feature extraction sub-network comprises a first convolutional layer group, a second convolutional layer group, a third convolutional layer group, a fourth convolutional layer group, a first pooling layer, a second pooling layer, and a third pooling layer; the first pooling layer is between the first convolutional layer group and the second convolutional layer group; the second pooling layer is between the second convolutional layer group and the third convolutional layer group; and the third pooling layer is between the third convolutional layer group and the fourth convolutional layer group.

Optionally, the first convolutional layer group comprises two convolutional layers and two active layers; the second convolutional layer group comprises two convolutional layers and two active layers; the third convolutional layer group comprises three convolutional layers and three active layers; and the fourth convolutional layer group comprises one convolutional layer and one active layer.

Optionally, extracting style features of the style image to generate the plurality of style feature maps using the feature extraction sub-network comprises extracting style features of the style image using the first convolutional layer group to generate a plurality of first intermediate style feature maps; down-sampling the plurality of first intermediate style feature maps using the first pooling layer to generate a plurality of first pooling style feature maps; extracting style features of the plurality of first pooling style feature maps using the second convolutional layer group to generate a plurality of second intermediate style feature maps; down-sampling the plurality of second intermediate style feature maps using the second pooling layer to generate a plurality of second pooling style feature maps; extracting style features of the plurality of second pooling style feature maps using the third convolutional layer group to generate a plurality of third intermediate style feature maps; down-sampling the plurality of third intermediate style feature maps using the third pooling layer to generate a plurality of third pooling style feature maps; and extracting style features of the plurality of third pooling style feature maps using the fourth convolutional layer group to generate a plurality of fourth intermediate style feature maps; wherein the plurality of style feature maps comprise the plurality of fourth intermediate style feature maps.

Optionally, extracting content features of the input image to generate the plurality of content feature maps using the feature extraction sub-network comprises extracting content features of the input image using the first convolutional layer group to generate a plurality of first intermediate content feature maps; down-sampling the plurality of first intermediate content feature maps using the first pooling layer to generate a plurality of first pooling content feature maps; extracting content features of the plurality of first pooling content feature maps using the second convolutional layer group to generate a plurality of second intermediate content feature maps; down-sampling the plurality of second intermediate content feature maps using the second pooling layer to generate a plurality of second pooling content feature maps; extracting content features of the plurality of second pooling content feature maps using the third convolutional layer group to generate a plurality of third intermediate content feature maps; down-sampling the plurality of third intermediate content feature maps using the third pooling layer to generate a plurality of third pooling content feature maps; and extracting content features of the plurality of third pooling content feature maps using the fourth convolutional layer group to generate a plurality of fourth intermediate content feature maps; wherein the plurality of content feature maps comprise the plurality of fourth intermediate content feature maps.

Optionally, the plurality of output feature maps are expressed as $$A(x, y) = \sigma(y) \cdot \left(\frac{x - \mu(x)}{\sigma(x)}\right) + \mu(y);$$

wherein [wherein $A(x, y)$ represents a three dimensional matrix formed by the plurality of output feature maps; x represents a three dimensional matrix formed by the plurality of content feature maps; y represents a three dimensional matrix formed by the plurality of style feature maps; $\mu(x)$ represents a three dimensional matrix constituted by a plurality of average values respectively derived from the plurality of content feature maps; $\sigma(x)$ represents a three dimensional matrix constituted by a plurality of variance values respectively derived from the plurality of content feature maps; $\mu(y)$ represents a three dimensional matrix constituted by a plurality of average values respectively derived from the plurality of style feature maps; $\sigma(y)$ represents a three dimensional matrix constituted by a plurality of variance values respectively derived from the plurality of style feature maps.

Optionally, the method described herein comprises pre-training the convolutional neural network; wherein pre-training the convolutional neural network comprises inputting a training content image and a training style image into the convolutional neural network; generating a plurality of training output images using the decoder sub-network and generating a plurality of training output feature maps using the morpher; extracting style features and content features of the plurality of training output images using an analysis network to generate a plurality of first training style feature maps and a plurality of training content feature maps; extracting style feature of the training style image using the analysis network to generate a plurality of second training style feature maps; computing loss of parameters of the decoder sub-network using a loss function, based on the plurality of first training style feature maps, the plurality of second training style feature maps, the plurality of training content feature maps, and the plurality of training output feature maps; and tuning the parameters of the decoder sub-network based on the loss.

Optionally, the method described herein comprises reiterating pre-training the convolutional neural network.

Optionally, the loss function comprises a content loss function and a style loss function; the loss comprises a content loss and a style loss; and computing loss of the parameters of the decoder sub-network comprises computing the content loss of the parameters of the decoder sub-network using the content loss function, based on the plurality of training content feature maps and the plurality of training output feature maps; and computing the style loss of the parameters of the decoder sub-network using the style loss function, based on the plurality of first training style feature maps and the plurality of second training style feature maps.

Optionally, the loss function is expressed as $L_t = \alpha \cdot L_c + \beta \cdot L_s$; wherein Lc represents the content loss function; Ls represents the style loss function; a represents a weight of the content loss function; β represents a weight of the style loss function; wherein the content loss function Lc is expressed as $$L_c = \frac{1}{2 \times C1} \times \|f_{11}(g(t)) - f_2(t)\|_2;$$

wherein t represents the training content image; g(t) represents the plurality of training output images; $f_{11}(g(t))$ represents a three dimensional matrix formed by the plurality of training content feature maps; $f_2(t)$ represents a three dimensional matrix formed by the plurality of training output feature maps; and C1 is a constant used to perform normalization; wherein the style loss function Ls is expressed as $$L_s = \sum_{k=1}^{4} \|\mu_k(f_{12}(g(t))) - \mu_i(f_{12}(s))\|_2 + \sum_{k=1}^{4} \|\sigma_k(f_{12}(g(t))) - \sigma_k(f_{12}(s))\|_2;$$

wherein s represents a training style image; $f_{12}(s)$ represents a three dimensional matrix formed by the plurality of second training style feature maps; $f_{12}(g(t))$ represents a three dimensional matrix formed by the plurality of first training style feature maps; $\mu_k(f_{12}(g(t)))$ represents a three dimensional matrix formed by average values of the plurality of first training style feature maps; $\mu_k(f_{12}(s))$ represent a three dimensional matrix formed by average values of the plurality of second training style feature maps; $\sigma_k(f_{12}(g(t)))$ represents a three dimensional matrix formed by variance values of the plurality of first training style feature maps; $\sigma_k(f_{12}(s))$ represents a three dimensional matrix formed by variance values of the plurality of second training style feature maps; k is an integer.

Optionally, the analysis network and the feature extraction sub-network comprise a same structure and same parameters.

In another aspect, the present invention provides an apparatus for generating a composite image, comprising a memory; one or more processors; wherein the memory and the one or more processors are connected with each other; and the memory stores computer-executable instructions for controlling the one or more processors to process an input image through a convolutional neural network to generate an output image comprising content features of the input image morphed with style features of a style image, wherein the convolutional neural network comprises a feature extraction sub-network, a morpher, and a decoder sub-network; wherein the memory stores computer-executable instructions for controlling the one or more processors to extract style features of the style image to generate a plurality of style feature maps using the feature extraction sub-network; extract content features of the input image to generate a plurality of content feature maps using the feature extraction sub-network; morph the plurality of content feature maps respectively with the plurality of style feature maps to generate a plurality of output feature maps using the morpher; and reconstruct the plurality of output feature maps through the decoder sub-network to generate the output image; wherein, to reconstruct the plurality of output feature maps through the decoder sub-network, the memory further stores computer-executable instructions for controlling the one or more processors to process the plurality of output feature maps through an M numbers of densely connected computational modules sequentially connected in the decoder sub-network, a respective one of the M numbers of densely connected computational modules comprising an N numbers of convolutional blocks sequentially connected, M being an integer ≥1, N being an integer ≥2; wherein groups of output feature maps respectively from any previous convolutional blocks of the N numbers of convolutional blocks in the respective one of the M numbers of densely connected computational modules are input into an n-th convolutional blocks of the N numbers of convolutional blocks in the respective one of the M numbers of densely connected computational modules to generate an n-th group of output feature maps, 2≤n≤N; and an output from an m-th densely connected computational module of the M numbers of densely connected computational modules comprises N numbers of groups of output feature maps respectively from the N numbers of convolutional blocks of the m-th densely connected computational module, 1≤m≤M.

Optionally, the decoder sub-network further comprises a plurality of un-pooling blocks; and a respective one of the plurality of un-pooling blocks comprises a convolutional layer; an active layer; and an un-pooling layer for performing an up-sampling operation.

Optionally, the feature extraction sub-network comprises a plurality of pooling blocks respectively corresponding to the plurality of un-pooling blocks of the decoder sub-network.

Optionally, the decoder sub-network further comprises an output layer; the M numbers of densely connected computational modules comprise a first densely connected computational module, a second densely connected computational module, and a third densely connected computational module; the plurality of un-pooling blocks comprises a first un-pooling block, a second un-pooling block, and a third un-pooling block; wherein reconstructing the plurality of output feature maps through the decoder sub-network comprises processing the plurality of output feature maps through the first un-pooling block to generate a plurality of first un-pooling feature maps; extracting features of the plurality of first un-pooling feature maps using the first densely connected computational module to generate a plurality of first intermediate decoded feature maps; processing the plurality of first intermediate decoded feature maps through the second un-pooling block to generate a plurality of second un-pooling feature maps; extracting features of the plurality of second un-pooling feature maps using the second densely connected computational module to generate a plurality of second intermediate decoded feature maps; processing the plurality of second intermediate decoded feature maps through the third un-pooling block to generate a plurality of third un-pooling feature maps; extracting features of the plurality of third un-pooling feature maps using the third densely connected computational module to generate a plurality of third intermediate decoded feature maps; and converting the plurality of third intermediate decoded feature maps from a feature space into an image space using the output layer, thereby generating the output image.

In another aspect, the present invention provides a computer-program product, comprising a non-transitory tangible computer-readable medium having computer-readable instructions thereon, the computer-readable instructions being executable by a processor to cause the processor to process an input image through a convolutional neural network to generate an output image comprising content features of the input image morphed with style features of a style image, wherein the convolutional neural network comprises a feature extraction sub-network, a morpher, and a decoder sub-network; wherein processing the input image through the convolutional neural network comprises extracting style features of the style image to generate a plurality of style feature maps using the feature extraction sub-network; extracting content features of the input image to generate a plurality of content feature maps using the feature extraction sub-network; morphing the plurality of content feature maps respectively with the plurality of style feature maps to generate a plurality of output feature maps using the morpher; and reconstructing the plurality of output feature maps through the decoder sub-network to generate the output image; wherein reconstructing the plurality of output feature maps through the decoder sub-network comprises processing the plurality of output feature maps through an M numbers of densely connected computational modules sequentially connected in the decoder sub-network, a respective one of the M numbers of densely connected computational modules comprising an N numbers of convolutional blocks sequentially connected, M being an integer $\geq 1$, N being an integer $\geq 2$; groups of output feature maps respectively from any previous convolutional blocks of the N numbers of convolutional blocks in the respective one of the M numbers of densely connected computational modules are input into an n-th convolutional blocks of the N numbers of convolutional blocks in the respective one of the M numbers of densely connected computational modules to generate an n-th group of output feature maps, $2 \leq n \leq N$; and an output from an m-th densely connected computational module of the M numbers of densely connected computational modules comprises N numbers of groups of output feature maps respectively from the N numbers of convolutional blocks of the m-th densely connected computational module, $1 \leq m \leq M$.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
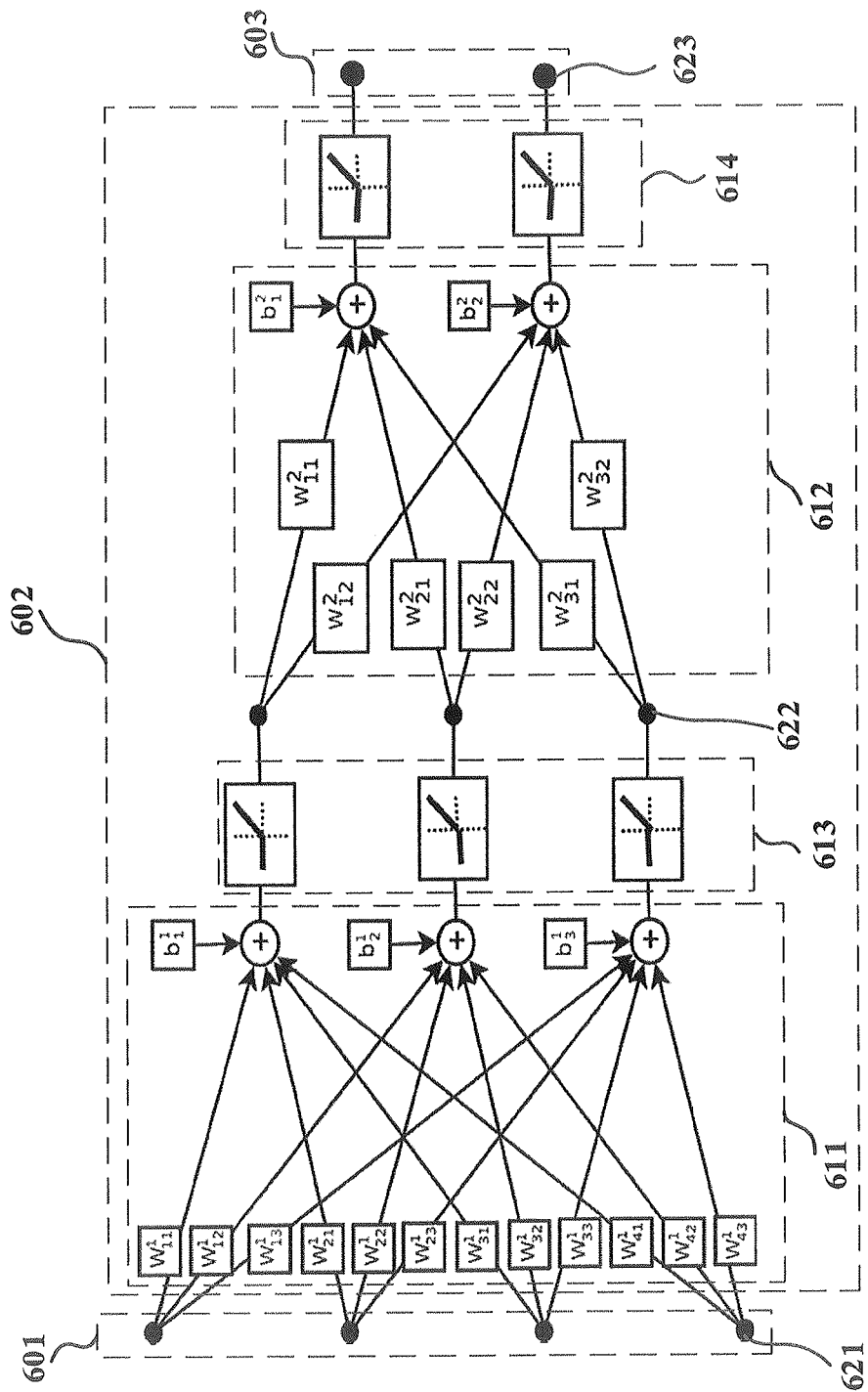
FIG. 1 is a schematic diagram of a convolutional neural network in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

It becomes quite popular to morph an image with a style of a reference style image in recently. The technology of morphing an image with a style of a reference style image can be used by products or services having functions of image processing based on cloud computing, style rendering, and functions of digital galleries.

Accordingly, the present disclosure provides, inter alia, a computer-implemented method using a convolutional neural network, an apparatus for generating a composite image, and a computer-program product that substantially obviate one or more of the problems due to limitations and disadvantages of the related art. In one aspect, the present disclosure provides a computer-implemented method using a convolutional neural network. In some embodiments, the computer-implemented method includes processing an input image through the convolutional neural network to generate an output image including content features of the input image morphed with style features of a style image. Optionally, the convolutional neural network includes a feature extraction sub-network, a morpher, and a decoder sub-network. Optionally, processing the input image through the convolutional neural network includes extracting style features of the style image to generate a plurality of style feature maps using the feature extraction sub-network; extracting content features of the input image to generate a plurality of content feature maps using the feature extraction sub-network; morphing the plurality of content feature maps respectively with the plurality of style feature maps to generate a plurality of output feature maps using the morpher; and reconstructing the plurality of output feature maps through the decoder sub-network to generate the output image. Optionally, reconstructing the plurality of output feature maps through the decoder sub-network includes processing the plurality of output feature maps through an M numbers of densely connected computational modules sequentially connected in the decoder sub-network, a respective one of the M numbers of densely connected computational modules comprising an N numbers of convolutional blocks sequentially connected, M being an integer $\geq 1$, N being an integer $\geq 2$. For example, groups of output feature maps respectively from any previous convolutional blocks of the N numbers of convolutional blocks in the respective one of the M numbers of densely connected computational modules are input into an n-th convolutional blocks of the N numbers of convolutional blocks in the respective one of the M numbers of densely connected computational modules to generate an n-th group of output feature maps, 2≤n≤N; and an output from an m-th densely connected computational module of the M numbers of densely connected computational modules includes N numbers of groups of output feature maps respectively from the N numbers of convolutional blocks of the m-th densely connected computational module, 1≤m≤M.

The computer-implemented method using a convolutional neural network herein can generate an output image including content features of an input image morphed with style features of any style image. The computer-implemented method herein can reduce the number of components of the convolutional neural network, and generate an output image using a fewer numbers of parameters than that in a conventional disclosure. The quality of the output image generated by the method herein is as good as the quality of an output image generated by a conventional disclosure. Hence, the convolutional neural network used in the method herein has a higher processing speed and a shorter processing time due to the decreased numbers of parameters used by the convolutional neural network.

FIG. 1 is a schematic diagram of a convolutional neural network in some embodiments according to the present disclosure. Referring to FIG. 1, a convolutional neural network (CNN) can be used in fields including image recognition, face recognition, text recognition, animal recognition, and image processing. For example, the convolutional neural network is used to process images. An input and an output of the convolutional neural network are images. Convolutional kernels of the convolutional neural network replace weights of scalars. In some embodiments, the convolutional neural network shown in FIG. 1 only has three layers. Optionally, the convolutional neural network includes an input layer 601, a hidden layer 602, and an output layer 603. Optionally, four inputs 621 are input in the input layer 601. Three outputs 622 are output from the hidden layer 602. Two outputs 623 are outputted from the output layer 603. So, the convolutional neural network can output two output images (e.g. Two outputs 623). For example, the four inputs 621 input in the input layer 601 are four images, or four features of one image. The three outputs 622 output from the hidden layer 602 can be three feature maps of the four images, or three feature maps of the four features of one images input in the input layer 601.

As used herein, the term "convolutional neural network" refers to a deep feed-forward artificial neural network. Optionally, a convolutional neural network includes a plurality of convolutional layers, a plurality of up-sampling layers, and a plurality of down-sampling layers. For example, a respective one of the plurality of convolutional layers can process an image. An up-sampling layer and a down-sampling layer can change a size of an input image to a size corresponding to a certain convolutional layer. The output from the up-sampling layer or the down-sampling layer can then be processed by a convolutional layer of a corresponding size. This enables the convolutional layer to add or extract a feature having a size different from that of the input image.

As used herein, the term "convolutional kernel" refers to a two-dimensional matrix used in a convolution process. Optionally, a respective one item of a plurality items in the two-dimensional matrix has a certain value.

As used herein, the term "convolution" refers to a process of processing an image. A convolutional kernel is used for a convolution. For, each pixel of an input image has a value, a convolution kernel starts at one pixel of the input image and moves over each pixel in an input image sequentially. At each position of the convolutional kernel, the convolutional kernel overlaps a few pixels on the image based on the scale of the convolution kernel. At a position of the convolutional kernel, a value of one of the few overlapped pixels is multiplied by a respective one value of the convolutional kernel to obtain a multiplied value of one of the few overlapped pixels. Subsequently, all multiplied values of the overlapped pixels are added to obtain a sum corresponding to the position of the convolutional kernel on the input image. By moving the convolutional kernel over each pixel of the input image, all the sums corresponding to all the position of the convolutional kernel are collected and output to form an output image. In one example, a convolution may extract different features of the input image using different convolution kernels. In another example, a convolution process may add more features to the input image using different convolution kernels.

As used herein, the term "convolutional layer" refers to a layer in a convolutional neural network. The convolutional layer is used to perform convolution on an input image to obtain an output image. Optionally, different convolution kernels are used to performed different convolutions on the same input image. Optionally, different convolution kernels are used to performed convolutions on different parts of the same input image. Optionally, different convolution kernels are used to perform convolutions on different input images, for example, multiple images are inputted in a convolutional layer, a respective convolutional kernel is used to perform a convolution on an image of the multiple images. Optionally, different convolution kernels are used according to different situations of the input image.

Referring to FIG. 1, in some embodiments, the hidden layer 602 includes a first hidden convolutional layer 611 and a second hidden convolutional layer 612. Optionally, the first hidden convolutional layer 611 and the second hidden convolutional layer 612 both has weights $w_{ij}^k$ and biases $b_i^k$. Weights $w_{ij}^k$ represent convolutional kernels. Biases $b_i^k$ are scalars added to outputs of convolutional layers. k represents a k-th input layer of the convolutional neural network. i represents a i-th input image of a plurality of input images input in a respective one of the input layer. j represents a j-th output of a plurality of outputs obtained from processing a respective one of the plurality of input images. k, i, j are positive integers. For example, the first hidden convolutional layer 611 includes a first group of convolutional kernels (e.g. $w_{ij}^1$), and a first group of weights (e.g. $b_i^1$). The second hidden convolutional layer 612 includes a second group of convolutional kernels (e.g. $w_{ij}^2$), and a second group of weights (e.g. $b_i^2$). In general, each convolutional layer include hundreds of convolutional kernels. For example, in a deep convolutional neural network, a hidden layer of the deep convolutional neural network includes at least five convolutional layers.

Referring to FIG. 1, the hidden layer 602 of the convolutional neural network further includes a first hidden active layer 613, and a second hidden active layer 614. The first hidden active layer 613 is between the first hidden convolutional layer 611 and the second hidden convolutional layer 612. The second hidden active layer 614 is sequentially after the second hidden convolutional layer 612. Optionally, an active layer (e.g. the first hidden active layer 613, the second hidden active layer 614) include activation functions. The active functions are used to add non-linear elements to the convolutional neural network, so that the convolutional neural network can effectively solve a relatively complicated problem.

As used herein, the term "active layer" refers to a layer in a convolutional neural network. An active layer can perform a non-linear mapping on an output signal output from a convolutional layer. Various functions may be used in an active layer. Examples of functions suitable for being adopted in an active layer include, but are not limited to a rectified linear units (ReLU) function, a sigmoid function, and a hyperbolic tangent function (e.g. a tanh function). In one example, an active layer is not included in a convolutional layer. In another example, a convolutional layer includes an active layer. For example, the first hidden convolutional layer 611 includes the first hidden active layer 613. The second hidden convolutional layer 612 includes the second hidden active layer 614.

In some embodiments, in the first hidden convolutional layer 611, the first group of convolutional kernels $w_{ij}^1$ and the first group of weights $b_i^1$ are applied to a respective one of the four input 621 to generate a plurality of outputs from the first hidden convolutional layer 611. The plurality of outputs from the first hidden convolutional layer 611 are processed by the first hidden active layer 613 to generate a plurality of outputs from the first hidden active layer 613.

In some embodiments, in the second hidden convolutional layer 612, the second groups of convolutional kernels $w_{ij}^2$ and the second group of weights $b_i^2$ are applied to a respective one of the plurality of outputs from the first hidden active layer 613 to generate a plurality of outputs from the second hidden convolutional layer 612. The plurality of outputs from the second hidden convolutional layer 612 are processed by the second hidden active layer 614 to generate a plurality of outputs from the second hidden active layer 614.

In one example, generating a respective one of the plurality of outputs from the first hidden convolutional layer 611 includes applying a respective one of the first group of convolutional kernels $w_{ij}^1$ to a respective one of the four input 621 to generate an first hidden intermediate output, and adding a respective one of the first group of weights $b_i^1$ to the intermediate output to generate the respective one of the plurality of outputs from the first hidden layer 611.

In another example, generating a respective one of the plurality of outputs from the second hidden convolutional layer 612 includes applying a respective one of the second group of convolutional kernels $w_{ij}^2$ to a respective one of the plurality of outputs from the first hidden convolutional layer 611 to generate a second hidden intermediate output, and adding a respective one of the second group of weights $b_i^2$ to the second hidden intermediate output to generate the respective one of the plurality of outputs from the second hidden convolutional layer 612.

For example, outputs from the first hidden active layer 613 is the three outputs 622 of the hidden layer 602. Outputs from the second hidden active layer 614 is the two outputs 623 of the output layer 603.

In some embodiments, a convolutional layer is a core layer of a convolutional neural network. In a convolutional layer, a neuron is connected with some of neurons in a direct adjacent convolutional layer. Optionally, a convolutional layer applies a plurality of convolutional kernels to an input image to extract a plurality of features from the input image. A convolutional layer can extract a type of features from the input image. Optionally, an initialized convolutional kernel is a random factional matrix. During the pre-training process of the convolutional neural network, the convolutional kernel obtains a reasonable value by learning.

Optionally, a result obtained by applying the convolutional kernel to an input image is called a feature map. The number of a plurality of feature maps is equivalent to the number of a plurality of convolutional kernels. A respective one of the plurality of feature maps corresponds to a respective one of the plurality of convolutional kernels.

Optionally, the respective one of the plurality of feature maps is formed by neurons rectangularly arranged. The neurons of the respective one of the plurality of feature maps share the respective one of the plurality of convolutional kernels.

Optionally, a convolutional neural network has a plurality of convolutional layers. A feature map output from a respective one of the plurality of convolutional layers is input into a downstream one of the plurality of convolutional layers. The downstream one of the plurality of convolutional layer processes the feature map output from the respective one of the plurality of convolutional layers and outputs a downstream feature map of the plurality of feature maps.

In some embodiments, a pooling layer is between two adjacent convolutional layers. In one example, the pooling layer is used to reduce the size of an input image to simplify the computational complexity and reduce the over-fitting phenomenon. In another example, the pooling layer can compress features and extract main features of the input image. Optionally, the pooling layer reduces a size of a respective one of the feature maps, but does not change the number of the feature maps. For example, an input image having a size of 12×12 is sampled by a 6×6 filter, subsequently, the 6×6 filter outputs an output image having a size of 2×2, which means the 144 pixels of the input image having the size of 12×12 is divided into four portions, each portion of the four portions of the 144 pixels has 36 pixels, subsequent to a pooling process using the 6×6 filter, the 36 pixels in each portion is combined into 1 pixel, and the output image generated has a size of 2×2.

As used herein, the term "pooling" refers to a type of down-sampling. Various methods may be used for pooling. Examples of methods suitable for pooling includes, but are not limited to, max-pooling, avg-polling, decimation, and demuxout. As used herein, the term "down-sampling" refers to a process of extracting features of an input image, and outputting an output image with a smaller size.

Figure 2A:
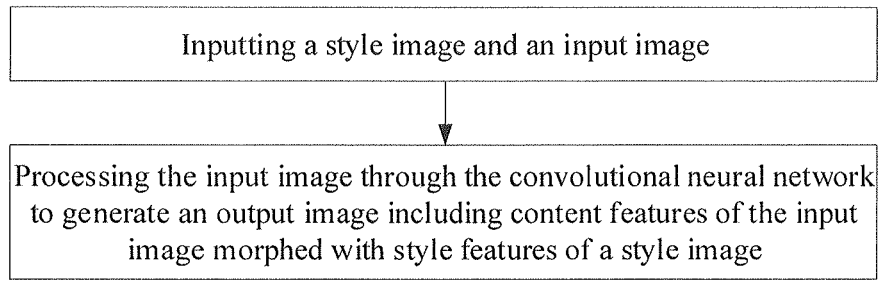
FIG. 2A is a flow chart illustrating a computer-implemented method using a convolutional neural network to process an image in some embodiments according to the present disclosure.

FIG. 2A is a flow chart illustrating a computer-implemented method using a convolutional neural network to process an image in some embodiments according to the present disclosure. Referring to FIG. 2A, in some embodiments, a computer-implemented method using a convolutional neural network, includes inputting a style image and an input image in the convolutional neural network, processing the input image through the convolutional neural network to generate an output image including content features of the input image morphed with style features of the style image.

In some embodiments, the input image can be any type of images. Optionally, the input image can be an image taken using an image capture device such as a digital camera or a mobile phone. Optionally, the input image can be selected from a group consisting of images of people, images of animals, images of plants, and image of sceneries.

In some embodiments, a style can be selected from a group consisting of styles of art masters, styles of arts drawn with different paints. Optionally, the styles of art masters include, but are not limited to, styles of Monet, styles of Van Gogh, and styles of Picasso. Optionally, styles of art include, but are not limited to, ink painting, oil painting, and sketching.

Figure 3:
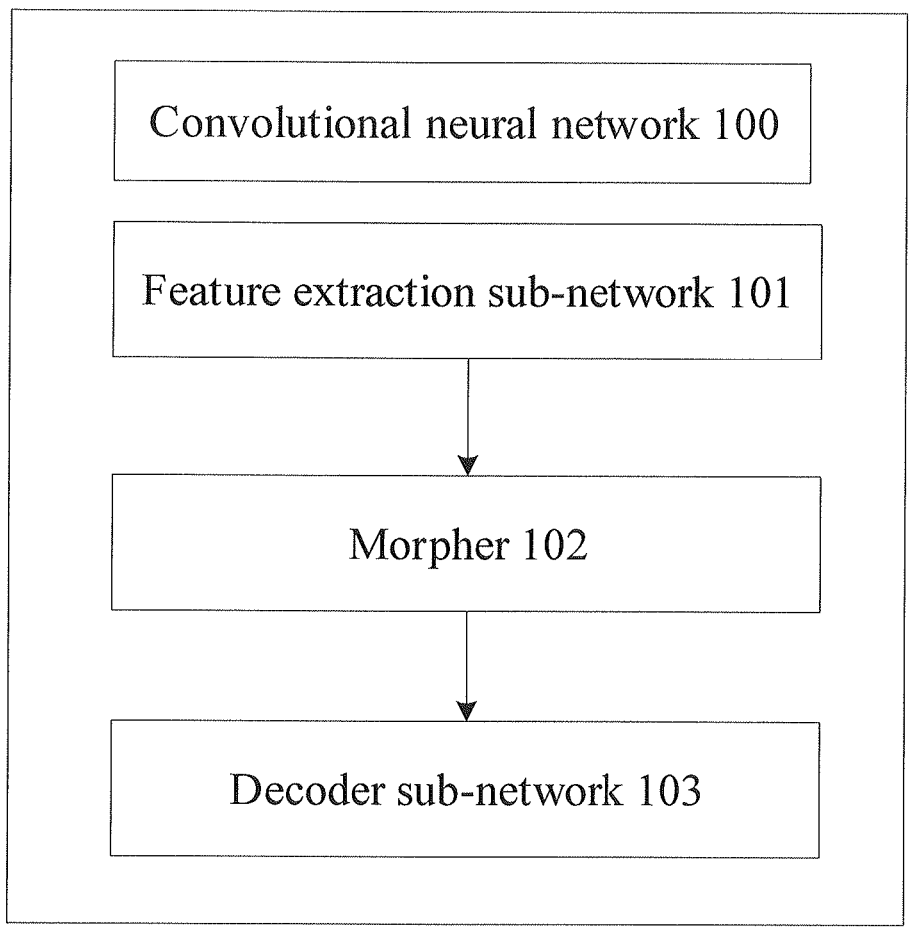
FIG. 3 is a schematic diagram illustrating a structure of a convolutional neural network in some embodiments according to the present disclosure.

FIG. 3 is a schematic diagram illustrating a structure of a convolutional neural network in some embodiments according to the present disclosure. Referring to FIG. 3, the convolutional neural network 100 includes a feature extraction sub-network 101, a morpher 102, and a decoder sub-network 103. Optionally, the feature extraction sub-network 101 is configured to extracting style features of the style image to generate a plurality of style feature maps, and extracting content features of the input image to generate a plurality of content feature maps. Optionally, the morpher 102 is configured to morphing the plurality of contents feature maps respectively with the plurality of style feature maps to generate a plurality of output feature maps. Optionally, the decoder sub-network 103 is configured to reconstructing the plurality of output feature maps to generate the output image.

Figure 2B:
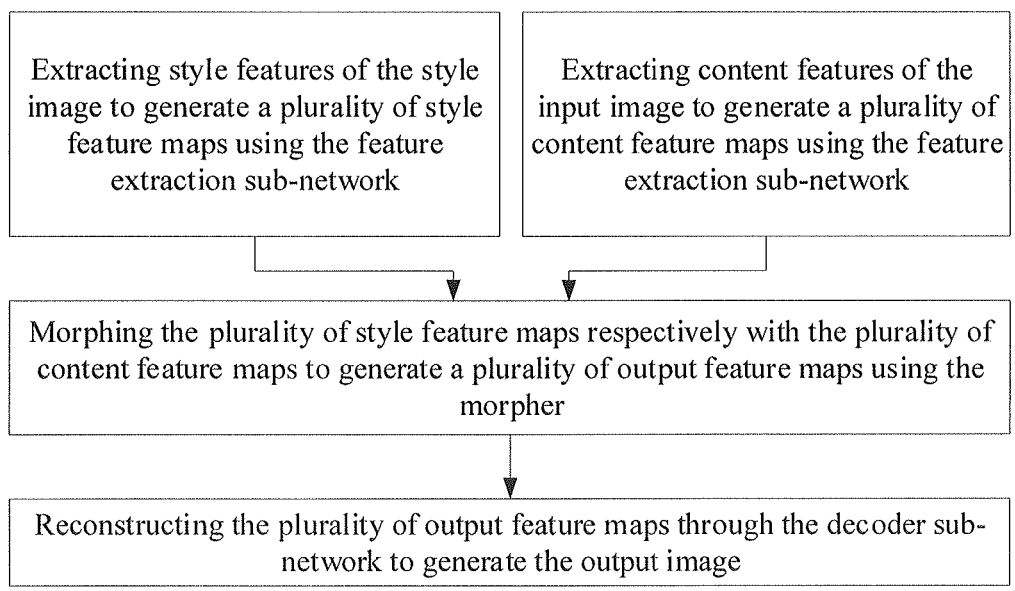
FIG. 2B is a flow chart illustrating processing an input image through the convolutional neural network in some embodiments according to the present disclosure.

FIG. 2B is a flow chart illustrating processing an input image through the convolutional neural network in some embodiments according to the present disclosure. Referring to FIG. 2A, FIG. 2B, and FIG. 3, processing the input image through the convolutional neural network 100 includes extracting style features of the style image to generate a plurality of style feature maps using the feature extraction sub-network 101; extracting content features of the input image to generate a plurality of content feature maps using the feature extraction sub-network 101; morphing the plurality of content feature maps respectively with the plurality of style feature maps to generate a plurality of output feature maps using the morpher 102; and reconstructing the plurality of output feature maps through the decoder sub-network 103 to generate the output image.

In some embodiments, feature maps includes the plurality of style feature maps, the plurality of content feature maps, and the plurality of output feature maps. The feature maps are described using two-dimensional matrixes. In one example, a respective one of the plurality of style feature maps is a two dimensional matrix. So, the plurality of style feature maps can be described using a three-dimensional matrix. In another example, a respective one of the plurality of content feature maps is a two-dimensional matrix. The plurality of content feature maps can be described using a three-dimensional matrix. In another example, a respective one of the plurality of output feature maps is a two-dimensional matrix. The plurality of output feature maps can be described using a three-dimensional matrix.

In some embodiments, the process of reconstructing the plurality of output feature maps through the decoder sub-network 103 includes processing the plurality of output feature maps through an M numbers of densely connected computational modules sequentially connected in the decoder sub-network 103. Optionally, a respective one of the M numbers of densely connected computational modules includes an N numbers of convolutional blocks sequentially connected, M being an integer $\geq 1$, N being an integer $\geq 2$.

In some embodiments, groups of output feature maps respectively from any previous convolutional blocks of the N numbers of convolutional blocks in the respective one of the M numbers of densely connected computational modules are input into an n-th convolutional blocks of the N numbers of convolutional blocks in the respective one of the M numbers of densely connected computational modules to generate an n-th group of output feature maps, $2 \leq n \leq N$.

Optionally, an input of the respective one of the M number of densely connected computational modules is input in an n-th convolutional blocks of the N numbers of convolutional blocks in the respective one of the M numbers of densely connected computational modules.

In some embodiments, an output from an m-th densely connected computational module of the M numbers of densely connected computational modules includes N numbers of groups of output feature maps respectively from the N numbers of convolutional blocks of the r-th densely connected computational module, $1 \leq m \leq M$.

Optionally, an output from the m-th densely connected computational module of the M numbers of densely connected computational modules includes an input of the n-th densely connected computational module of the M numbers of densely connected computational modules.

Figure 4A:
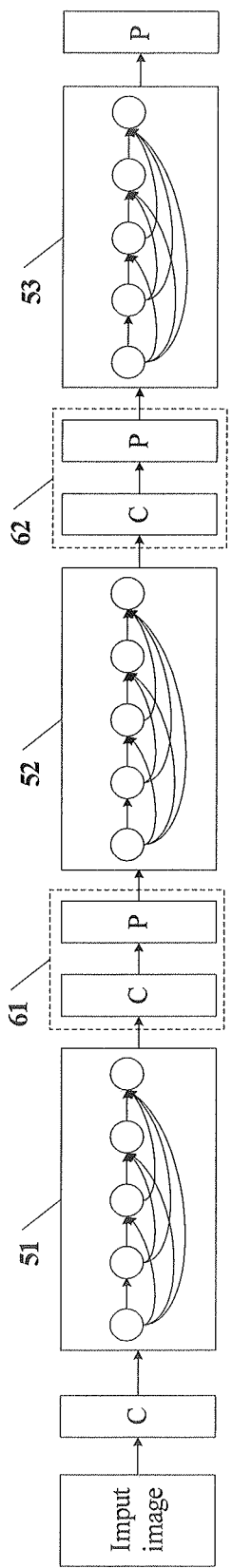
FIG. 4A is a schematic diagram illustrating a structure of a dense convolutional network in some embodiments according to the present disclosure.
Figure 4B:
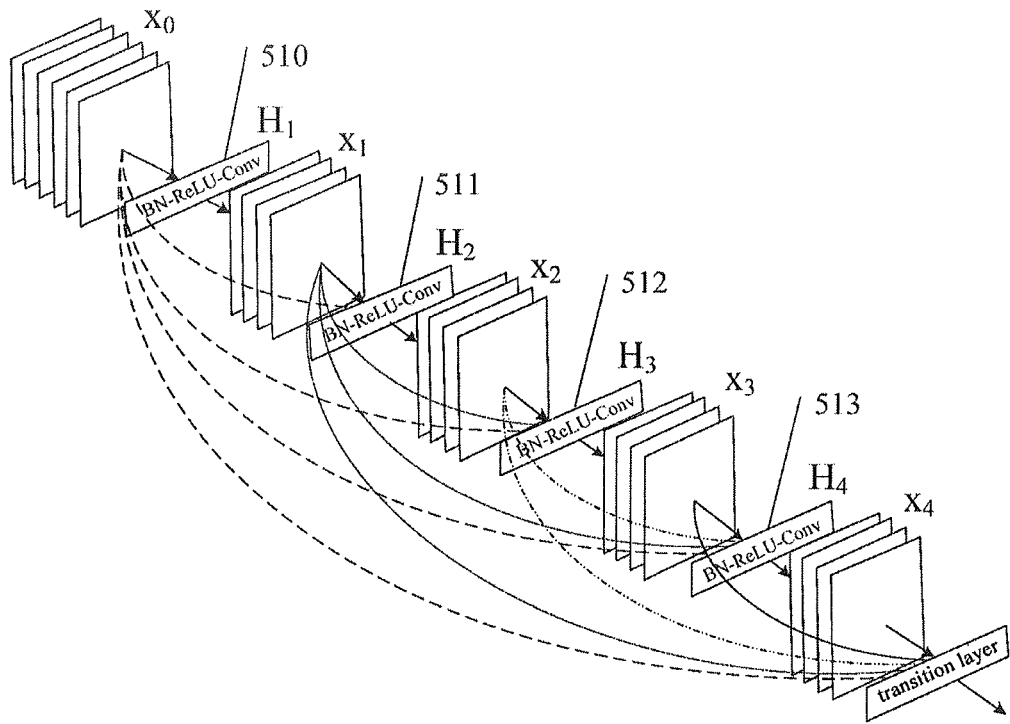
FIG. 4B is a schematic diagram illustrating a structure of dense blocks of a dense convolutional network in some embodiments according to the present disclosure.

FIG. 4A is a schematic diagram illustrating a structure of a dense convolutional network in some embodiments according to the present disclosure. FIG. 4B is a schematic diagram illustrating a structure of dense blocks of a dense convolutional network in some embodiments according to the present disclosure. Referring to FIG. 4A and FIG. 4B, a dense convolutional network can be used in image classification. For a convolutional neural network other than a dense convolutional network, an output from an N-th convolutional layer is an input to a N+1-th convolutional layer. For example, the convolutional neural network other than a dense convolutional network has L layers of convolutional layers. The convolutional neural network other than a dense convolutional network has L connections. (wherein N and L are positive integers, and L>N>1.)

For a dense convolutional network, the dense convolutional network has a dense convolutional connection. The dense convolutional connection is configured to input outputs from any previous convolutional layers of a plurality of convolutional layers to a respective one of the plurality of convolutional layers in the dense convolutional network. For example, the dense convolutional network has L layers of convolutional layers. The number of connections between two convolutional layers of the L convolutional layers is L(L+1)/2. Two convolutional layers of the L convolutional layers are connected in series.

In some embodiments, in the dense convolutional network, feature maps $x_l$ output from the l-th convolutional layer of the L convolutional layers is $x_l = H_l([x_0, x_1, \ldots, x_{l-1}])$, wherein $H_l(.)$ represents a process of extracting features. Optionally, $H_l(.)$ is a combination of operations selecting from a group of an operation of batch normalization, an activation operation, and a convolutional operation. For example, the $H_l(.)$ is a combination of an operation of batch normalization BN, an activation operation (e.g. ReLU), and a convolution operation (e.g. a convolution operation adopting a 3×3 convolutional kernel). $x_0$ represents the input image. $x_1, \ldots, x_{l-1}$ respectively represent output feature maps output from first layer of the convolutional layers to the l−1-th layer of the convolutional layers. $x_1, \ldots, x_{l-1}$ have a same size.

In some embodiments, the dense convolutional network includes a plurality of dense blocks, and a plurality of transition layers. Optionally, the plurality of dense blocks and the plurality of transition layers are alternatively arranged. For example, a respective one of the plurality of transition layers is between two direct adjacent blocks of the plurality of dense blocks.

In some embodiments, a respective one of the plurality of dense blocks adopts a plurality of convolutional kernels to perform convolution operations on feature maps to extract features from the feature maps.

Referring to FIG. 4A, in some embodiments, the plurality of dense blocks includes a first dense block 51, a second dense block 52, and a third dense block 53. Referring to FIG. 4B, FIG. 4B shows a structure of the first dense block 51. In some embodiments, the first dense block 51 includes a first convolutional computational module 510, the second convolutional computational module 511, a third convolutional computational module 512, and a fourth convolutional computational module 513. For example, to process an input image $X_0$, the first convolutional computational module 510 performs a first feature extraction operation $H_1$ on the image $X_0$, to generate a plurality of first feature maps $X_1$. The second convolutional computational module 511 performs a second feature extraction operation $H_2$ on the input image $X_0$ and the plurality of first feature maps $X_1$, to generate a plurality of second feature maps $X_2$. The third convolutional computational module 512 performs a third feature extraction operation $H_3$ on the input image $X_0$, the plurality of first feature maps $X_1$, and the plurality of second feature maps $X_2$, to generate a plurality of third feature maps $X_3$. The fourth convolutional computational module 513 performs a fourth feature extraction operation $H_4$ on the input image $X_0$, the plurality of first feature maps $X_1$, the plurality of second feature maps $X_2$, and the plurality of third feature maps $X_3$, to generate a plurality of fourth feature maps $X_4$. The input image $X_0$, the plurality of first feature maps $X_1$, the plurality of second feature maps $X_2$, the plurality of third feature maps $X_3$, and the plurality of fourth feature maps $X_4$ are output to a respective one of the plurality of transition layers.

In some embodiments, a respective one of the plurality of dense blocks further includes a 1×1 convolutional kernel. The 1×1 convolutional kernel can reduce the number of the feature maps extracted by a convolutional computational module (e.g. dimensionality reduction), further reduce the number of the feature maps, and further reduce the amount of computation.

In some embodiments, in the respective one of the plurality of dense blocks, each of the plurality of convolutional computational modules outputs a group of feature maps. Each groups of feature maps has a same number of feature maps. Optionally, kt is a growth rate to control the number of feature maps output from the dense convolutional network. In a dense convolutional network, the growth rate kt is relatively small. For example, the growth rate kt of a dense convolutional network is 32.

In some embodiments, the dense convolutional network (DenseNet) has the following advantages. Firstly, the dense convolutional network can greatly decrease the number of parameters of the dense convolutional network. For example, when the dense convolutional network has an accuracy equivalent to an accuracy a residual neural network (ResNet), the number of parameters of the dense convolutional network is less than half of the number of parameters of the residual neural network. Secondly, the dense convolutional network can reduce the amount of calculation. For example, when the dense convolutional network has an accuracy equivalent to an accuracy of the residual neural network, the amount of calculation of the dense convolutional network is substantially half of the amount of calculation of the residual neural network. Thirdly, the dense convolutional network can effectively solve the problem of gradient disappearance. Fourthly, the dense convolutional network can repeatedly use features, which can amplify the propagation of the features. Fifthly, the dense convolutional network has a very good anti-over-fitting performance, especially when the pre-training process lacks data. Based on the advantages of the dense convolutional network, the decoder sub-network 103 of the convolutional neural network described in the present disclosure may adopts an improved dense convolutional network to generate an output image including content features of an input image morphed with any styles.

In some embodiments, a plurality of transition layer are used to reduce the number of feature maps, reduce the number of the feature maps, which leads to the reduction of the number of parameters in a convolutional neural network and the reduction of amount of computation. Optionally, the plurality of transition layers are used to combine features from different channels. Optionally, a respective one of the plurality of transition layers includes a convolutional layer (e.g. a convolutional layer adopting a 1×1 convolutional kernel) configured to perform convolution operation, and a pooling layer (e.g. an average pooling layer) configured to perform down-pooling operation.

Optionally, in the respective one of transition layers, the number of feature maps output from a convolutional layer is half of the number of feature map input into the convolutional layer. Referring to FIG. 4A, optionally, the plurality of transition layers include a first transition layer 61 and a second transition layer 62. Optionally, the first transition layer 61 includes a convolutional layer C and a pooling layer P. Optionally, the second transition layer 62 includes a convolutional layer C and a pooling layer P.

Figure 5A:
FIG. 5A is a schematic diagram illustrating a structure of a decoder sub-network in some embodiments according to the present disclosure.

FIG. 5A is a schematic diagram illustrating a structure of a decoder sub-network in some embodiments according to the present disclosure. Referring to FIG. 5A, a decoder sub-networking includes an M numbers of densely connected computational modules, M is an integer ≥1. Optionally, a decoder sub-network shown in FIG. 5A includes a first densely connected computational module DB1, a second densely connected computational module DB2, and a third densely connected computational module DB3.

In some embodiments, a respective one of the M numbers of densely connected computational modules includes an N numbers of convolutional blocks sequentially connected, N is an integer ≥2.

In some embodiments, an n-th convolutional blocks of the N numbers of convolutional blocks in a respective one of the M numbers of densely connected computational modules is configured to receives and processes groups of output feature maps respectively from any previous convolutional blocks of the N numbers of convolutional blocks in the respective one of the M numbers of densely connected computational modules, to generate an n-th group of output feature maps, 2≤n≤N, and n is an integer.

Optionally, an input of the respective one of the M number of densely connected computational modules is input in an n-th convolutional blocks of the N numbers of convolutional blocks in the respective one of the M numbers of densely connected computational modules.

In some embodiments, an output from an m-th densely connected computational module of the M numbers of densely connected computational modules include N numbers of groups of output feature maps respectively from the N numbers of convolutional blocks of the m-th densely connected computational module, 1≤m≤M, and m is an integer.

In some embodiments, an output of an m-th densely connected computational module of the M numbers of densely connected computational modules further includes an input of the m-th densely connected computational module of the M numbers of densely connected computational modules.

A format of an input of a dense convolutional network is an image format, however, the decoder sub-network 103 as a part of a convolutional neural network is configured to receive and process outputs from the morpher 102. A format of an input of the decoder sub-network 103 is a feature map format which is different from the image format. So, a normal structure of a dense convolutional network should be modified to be an improved structure, so that the decoder sub-network 103 adopting the improved structure of the dense convolutional network can receive and process an input having a feature map format.

The dense convolutional network includes a plurality of dense blocks configured to perform a batch normalization BN operation, an activation operation (e.g. ReLU), and a convolution operation. For example, a respective one of the plurality of dense blocks has a normalization layer, an active layer, and a convolutional layer, and functions of the respective one of the plurality of dense blocks can be expressed as BN–ReLU–Conv(3×3). Optionally, the convolution operation uses a 3×3 convolutional kernel. Optionally, the batch normalization BN operation normalizes the features, after the normalization, the pre-training speed can be increased, and the quality of an output image can be improved. In one example, the batch normalization BN is similar to an instance normalization IN. Both the batch normalization BN operation and the instance normalization IN operation are used in the process of morphing the input image with only one preset style. For morphing an input image with a random style (e.g. depending on the style of a chosen style image), the batch normalization BN operation and the instance normalization IN operation will not optimize the process, instead, the batch normalization BN operation and the instance normalization IN operation may have an adverse effect on the pre-training process.

In some embodiments, the convolutional neural network in the present disclosure can generate an output image including content features of an input image morphed with style features of any style image, which means the convolutional neural network can morph the input image with any style. The respective one of the plurality of dense blocks of convolutional neural network cannot use a normalization layer since the instance normalization IN operation or the batch normalization BN operation may have an adverse effect on the pre-training process. So, the normalization layer in a normal structure of the respective one of the plurality of dense blocks of the dense convolutional network should be removed to obtain the improved structure. The improved structure the dense convolutional network adopted by the decoder sub-network 103 include a plurality of dense blocks each of which has a convolutional layer and an active layer.

In some embodiments, the respective one of the M numbers of densely connected computational modules adopts the improved structure of the dense convolutional network. Optionally, functions of a respective one of the N numbers of convolutional blocks are the same as functions of the respective one of the plurality of dense blocks of the dense convolutional network. For example, the functions of the respective one of the N numbers of convolutional blocks includes an activation operation (e.g. ReLU), and a convolution operation (e.g. a convolution operation adopts a 3×3 convolutional kernel).

In a normal structure of the dense convolutional network, a respective one of a plurality of transition layers follows a respective one of the plurality of dense blocks. The respective one of the plurality of transition layers includes a pooling layer. In the present disclosure, the feature extraction sub-network 101 has a plurality of pooling blocks, in order for a structure of the decoder sub-network 103 to correspond to a structure of the feature extraction sub-network 101, the decoder sub-network 103 should have a plurality of un-pooling blocks corresponding to plurality of pooling blocks of the feature extraction sub-network 101.

Therefore, the improved structure of the dense convolutional network adopted by the decoder sub-network 103 should replaces a plurality of pooling blocks (layers) in a normal structure of the dense convolutional network with a plurality of un-pooling blocks (layer). Moreover, a respective one of the densely connected computational modules follows a respective one of the un-pooling blocks, which is contrary to the normal structure having the respective one of the plurality of pooling blocks following the respective one of the plurality of dense blocks.

Figure 5B:
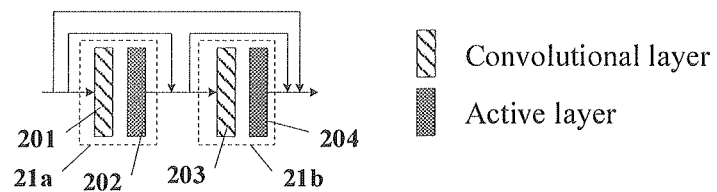
FIG. 5B is a schematic diagram illustrating a structure of a densely connected computational module in a decoder sub-network in some embodiments according to the present disclosure.

FIG. 5B is a schematic diagram illustrating a structure of a densely connected computational module in a decoder sub-network in some embodiments according to the present disclosure.

Referring to FIG. 5B, in some embodiments, an m-th densely connected computational module of the M numbers of densely connected computational modules includes N numbers of convolutional blocks. Optionally, a respective one of the N numbers of convolutional blocks includes a convolutional layer and an active layer.

In some embodiments, the m-th densely connected computational module of the M numbers of densely connected computational modules includes two convolutional blocks (e.g. N of the N numbers of convolutional blocks is 2). And each of the two convolutional blocks has the convolutional layer and the active layer. In some embodiments, the m-th densely connected computational module of the M numbers of densely connected computational modules includes three convolutional blocks (e.g. N of the N numbers of convolutional blocks is 3). In some embodiments, the m-th densely connected computational module of the M numbers of densely connected computational modules includes four convolutional blocks (e.g. N of the N numbers of convolutional blocks is 4).

In some embodiments, each of the M numbers of densely connected computational modules has a same number of convolutional blocks. In some embodiments, the M numbers of densely connected computational modules may have different numbers of convolutional blocks. In one example, a first one of the M numbers of densely connected computational modules has N1 convolutional blocks, a second one of the M numbers of densely connected computational modules has N2 convolutional blocks, N1 being different from N2.

For example, referring to FIG. 5A, the first densely connected computational module DB1 includes two convolutional blocks. The second densely connected computational module DB2 includes four convolutional blocks. The third densely connected computational module DB3 includes three convolutional blocks.

Referring to FIG. 5B, in some embodiments, an m-th densely connected computational module of the M numbers of densely connected computational modules includes two convolutional blocks (e.g. N of the N numbers of convolutional blocks is 2). Optionally, the two convolutional blocks included in the m-th densely connected computational module are first convolutional block 21a, and a second convolutional block 21b. Optionally, the first convolutional block 21a includes a first convolutional layer 201, and a first active layer 202. Optionally, the second convolutional block 21b includes a second convolutional layer 203, and a second active layer 204. Optionally, the first convolutional layer 201 and the second convolutional layer 203 are configured to perform convolution operation.

In some embodiments, the first convolutional layer 201 includes a plurality of first convolutional kernels to respectively extract a plurality of types of features. For example, a respective one of the plurality of first convolutional kernels is a 3×3 convolutional kernel. Optionally, the second convolutional layer 203 includes a plurality of second convolutional kernels to respectively extract a plurality of types of features. For example, a respective one of the plurality of second convolutional kernels is a 3×3 convolutional kernel.

In some embodiments, convolutional layers in a respective one of the N numbers of convolutional blocks have a same number of convolutional kernels, which ensures that a group of output feature maps output from a respective one of the N numbers of convolutional blocks has a same number of output feature maps. In one example, the number of the first convolutional kernels of the first convolutional layer 201 is equivalent to the number of the second convolutional kernels of the second convolutional layer 203. In another example, the first convolutional layer 201 includes 12 first convolutional kernels. The second convolutional layer 203 includes 12 second convolutional kernels.

In some embodiments, the numbers of convolutional kernels in different convolutional blocks of the N numbers of convolutional blocks in a respective one of the M numbers of densely connected computational modules are different.

In some embodiments, convolutional layers in different convolutional blocks of N numbers of convolutional blocks in a respective one of the M numbers of densely connected computational modules are different. In some embodiments, active layers in different convolutional blocks of N numbers of convolutional blocks in a respective one of the M numbers of densely connected computational modules are different. For example, the first convolutional layer 201 is different from the second convolutional layer 203. The first active layer 202 is different from the second active layer 204.

In some embodiments, in the decoder sub-network 103, at least two of the N numbers of convolutional blocks have same convolutional layers and same active layers, wherein same convolutional layers refers to convolutional layers having the same number of convolutional kernels, and same parameters, and same active layer refers to active layers having same parameters.

In some embodiments, the first convolutional layer 201 includes a plurality of 3×3 convolutional kernels. Optionally, the first convolutional layer 201 includes a plurality of 3×3 convolutional kernels and a plurality of 1×1 convolutional kernels. In some embodiments, the second convolutional layer 203 includes a plurality of 3×3 convolutional kernels. Optionally, the second convolutional layer 203 includes a plurality of 3×3 convolutional kernels and a plurality of 1×1 convolutional kernels.

In some embodiments, the first active layer 202 is configured to perform an activation operation on a first group of output feature maps from the first convolutional layer 201. In some embodiments, the second active layer 204 is configured to perform an activation operation on a second group of output feature maps from the second convolutional layer 203.

In some embodiments, both the first active layer 202 and the second active layer 204 have activation functions. The active functions are used to add non-linear elements in the decoder sub-network 103, so that the decoder sub-network 103 can effectively solve a relatively complicated problem. Optionally, the activation functions includes rectified linear units (ReLU) functions. The ReLU functions are an unsaturated nonlinear functions including a Leaky-ReLU function, a P-ReLU function, and a R-ReLU function. In one example, an activation function used in the first active layer 202 is the same as an activation function used in the second active layer 204. In another example, the active function used in the first active layer 202 is different from the activation function used in the second active layer 204.

In some embodiments, referring to FIG. 5A, the decoder sub-network 103 further includes a plurality of un-pooling blocks. For example, the plurality of un-pooling blocks includes a first un-pooling block T1, the second un-pooling block T2, and the third un-pooling block T3.

Figure 5C:
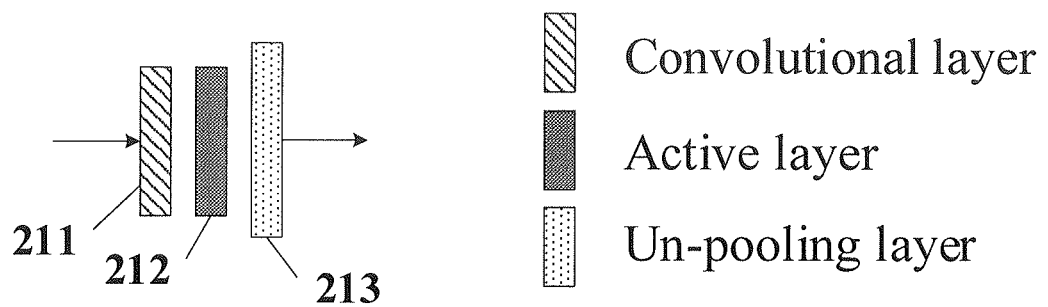
FIG. 5C is a schematic diagram illustrating a structure of an un-pooling block in a decoder sub-network in some embodiments according to the present disclosure.

FIG. 5C is a schematic diagram illustrating a structure of an un-pooling block of a decoder sub-network in some embodiments according to the present disclosure. Referring to FIG. 5C, in some embodiments, a respective one of the plurality of un-pooling blocks includes a convolutional layer; an active layer; and an un-pooling layer for performing an up-sampling operation. For example, FIG. 5C shows a structure of the first un-pooling block T1. Referring to both FIG. 5C and FIG. 5A, the first un-pooling block T1 includes a first un-pooling convolutional layer 211; a first un-pooling active layer 212; and a first un-pooling layer 213 for performing an up-sampling operation. The second un-pooling block T2 includes a second un-pooling convolutional layer; a second un-pooling active layer; and a second un-pooling layer for performing an up-sampling operation. The third un-pooling block T3 includes a third un-pooling convolutional layer; a third un-pooling active layer; and a third un-pooling layer for performing an up-sampling operation.

In some embodiments, the convolutional layers in the N numbers of convolutional blocks are different from the convolutional layers in the plurality of un-pooling blocks. In some embodiments, at least one of the convolutional layers in the N numbers of convolutional blocks is the same as one of the convolutional layers in the plurality of un-pooling blocks.

In some embodiments, the active layers in the N numbers of convolutional blocks are different from the active layers in the plurality of un-pooling blocks. In some embodiments, at least one of the active layers in the N numbers of convolutional blocks is the same as one of the active layers in the plurality of un-pooling blocks.

In some embodiments, the first un-pooling convolutional layer 211 includes a plurality of third convolutional kernels to perform convolution operation. Optionally, the plurality of third convolutional kernels includes a 1×1 convolutional kernel. Optionally, the first un-pooling convolutional layer 211 is used to decrease the number of the feature maps input in the first un-pooling convolutional layer 211, which may reduce the number of the feature maps.

In some embodiments, the number of convolutional kernels of a convolutional layer of the second un-pooling block T2 is equivalent to the number of convolutional kernels of a convolutional layer of the third un-pooling block T3. But the number of convolutional kernels of a convolutional layer of the second un-pooling block T2 is different from the number of convolutional kernels of a convolutional layer of the first un-pooling block T1. For example, a convolutional layer of the second un-pooling block 12 has 12 convolutional kernels. A convolutional layer of the third un-pooling block T3 has 12 convolutional kernels. A convolutional layer of the first un-pooling block T1 has 64 convolutional kernels.

In some embodiments, a first un-pooling active layer 212 is configured to perform active operation on feature maps output from the first un-pooling convolutional layer 211. Optionally, the first un-pooling active layer 212 has a ReLU function.

In some embodiments, the first un-pooling layer 213 is configured to perform up-sampling operation on the outputs from the first un-pooling active layer 212. The first un-pooling layer 213 can increase the data amount of feature maps input in the first un-pooling layer 213. The decoder sub-network 102 performs up-sampling using the first un-pooling layer 213, which can reduce the computation of up-sampling, improve the calculation speed of the convolutional neural network, and reduce usages of memory.

In some embodiments, an up-sampling performed by the first un-pooling block T1, an up-sampling performed by the second un-pooling block T2, and an up-sampling performed by the third un-pooling block T3 are the same. In some embodiments, at least two of the up-sampling performed by the first un-pooling block T1, the up-sampling performed by the second un-pooling block T2, and the up-sampling performed by the third un-pooling block T3 are different.

Various appropriate ways may be used by an up-pooling layer perform up-sampling. Optionally, the first un-pooling layer 213 can use max-pooling to perform up-sampling. And a sampling factor is a 2×2 matrix. Optionally, the first un-pooling layer 213 can used a strides transposed convolution, or an interpolation (e.g. interpolated values, two cubic interpolations, etc.) to perform up-sampling.

Comparing a densely connected computational modules in the decoder sub-network with a dense block in a dense convolutional network, the densely connected computational modules in the decoder sub-network does not include a normalization layer, while the dense block in the dense convolutional network includes a normalization layer.

The dense convolutional network further includes a plurality of transition layers. The plurality of un-pooling blocks of the decoder sub-network respectively corresponds to the plurality of transition layers of a dense convolutional network. Comparing the plurality of un-pooling blocks of the decoder sub-network with the plurality of transition layers of the dense convolutional network, the plurality of un-pooling blocks of the decoder sub-network are configured to perform up-sampling, instead the plurality of transition layers of the dense convolutional network are configured to perform down-sampling.

Figure 5D:
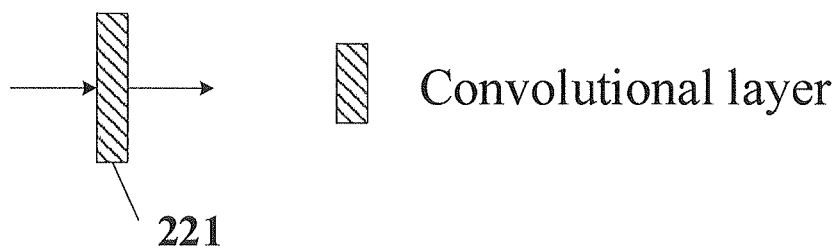
FIG. 5D is a schematic diagram illustrating a structure of an output layer of a decoder sub-network in some embodiments according to the present disclosure.

FIG. 5D is a schematic diagram illustrating a structure of an output layer of a decoder sub-network in some embodiments according to the present disclosure. Referring to FIG. 5A and FIG. 5D, in some embodiments, the decoder sub-network 103 further includes an output layer OP. Optionally, the output layer OP includes an output convolutional layer 221. Optionally, the output layer OP is configured to converting feature maps from the third densely connected computational module DB3 from a feature space into an image space, to generate the output images.

Referring to FIG. 5A, in some embodiments, the M numbers of densely connected computational modules includes a first densely connected computational module DB1, a second densely connected computational module DB2, and a third densely connected computational module DB3. The plurality of un-pooling blocks includes a first un-pooling block T1, a second un-pooling block T2, and a third un-pooling block T3.

Optionally, the first un-pooling block T1, the first densely connected computational module DB1, the second un-pooling block T2, the second densely connected computational module DB2, the third un-pooling block T3, and the third densely connected computational module DB3 are sequentially connected. In one example, the first un-pooling block T1 is prior to the first densely connected computational module DB1. In another example, the second un-pooling block T2 is between the first densely connected computational module DB1 and the second densely connected computational module DB2. In another example, the third un-pooling block T3 is between the second densely connected computational module DB2 and the third densely connected computational module DB3.

Optionally, the first densely connected computational module DB1 is configured to receive outputs from the first un-pooling block T1 and generate outputs to the second un-pooling block T2. Optionally, the second densely connected computational module DB2 is configured to receive outputs from the second un-pooling block T2 and generate outputs to the third un-pooling block T3. The third densely connected computational module DB3 is configured to receive outputs from the third un-pooling block T3 and generate outputs to the output layer OP.

Figure 6A:
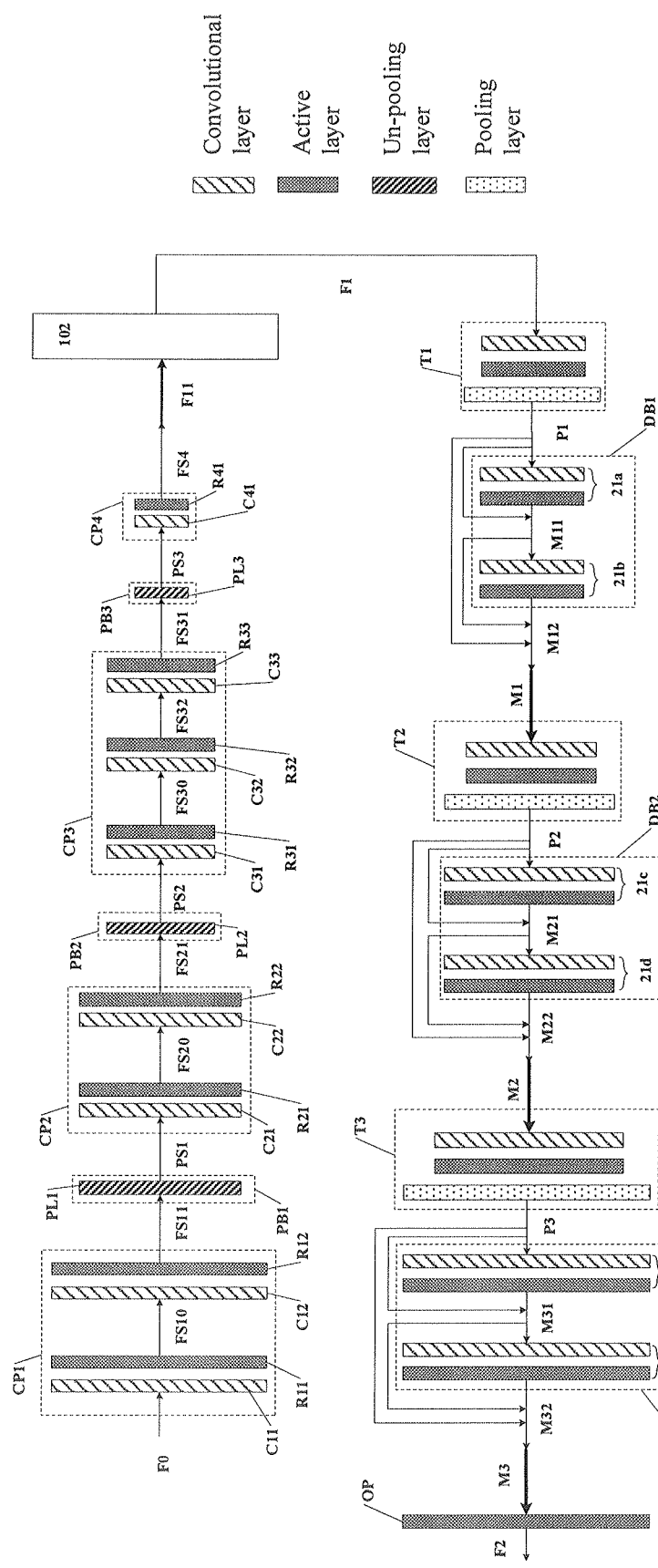
FIG. 6A is a schematic diagram illustrating a structure of a convolutional neural network in some embodiments according to the present disclosure.

FIG. 6A is a schematic diagram illustrating a structure of a convolutional neural network in some embodiments according to the present disclosure. Referring to FIG. 2B and FIG. 6A, in some embodiments, reconstructing the plurality of output feature maps through the decoder sub-network 103 further includes processing the plurality of output feature maps F1 through the first un-pooling block T1 to generate a plurality of first un-pooling feature maps P1; extracting features of the plurality of first un-pooling feature maps P1 using the first densely connected computational module DB1 to generate a plurality of first intermediate decoded feature maps M1; processing the plurality of first intermediate decoded feature maps M1 through the second un-pooling block T2 to generate a plurality of second un-pooling feature maps P2; extracting features of the plurality of second un-pooling feature maps P2 using the second densely connected computational module DB2 to generate a plurality of second intermediate decoded feature maps M2; processing the plurality of second intermediate decoded feature maps M2 through the third un-pooling block T3 to generate a plurality of third un-pooling feature maps P3; extracting features of the plurality of third un-pooling feature maps P3 using the third densely connected computational module DB3 to generate a plurality of third intermediate decoded feature maps M3; and converting the plurality of third intermediate decoded feature maps M3 from a feature space into an image space using the output layer OP, to generate the output image F2.

In some embodiments, the number of the plurality of output feature maps F1 is 512, and the plurality of output feature maps have a same size (e.g. 28×28). Referring to FIG. 5C and FIG. 6A, in some embodiments, in the process of processing the plurality of output feature maps F1 through the first un-pooling block T1 to generate the plurality of first un-pooling feature maps P1, the first un-pooling block T1 is configured to sequentially perform a convolution operation, an activation operation, and an up-sampling operation on the plurality of output feature maps F1, to generate the plurality of first un-pooling feature maps P1. Optionally, the number of feature maps of the plurality of first un-pooling feature maps P1 is reduced to 64. The plurality of first un-pooling feature maps P1 have a same size (e.g. 56×56).

In some embodiments, in the process of extracting features of the plurality of first un-pooling feature maps P1 using the first densely connected computational module DB1 to generate the plurality of first intermediate decoded feature maps M1, the first densely connected computational module DB1 includes a first convolutional block 21a and a second convolutional block 21b.

Optionally, the first convolutional block 21a of the first densely connected computational module DB1 is configured to sequentially perform a convolution operation and an activation operation on the plurality of first un-pooling feature maps P1, to generate a first group of output feature maps M11.

Optionally, the second convolutional block 21b of the first densely connected computational module DB1 is configured to sequentially perform a convolution operation and an activation operation on the plurality of first un-pooling feature maps P1 and the first group of output feature maps M11, to generate a second group of output feature maps M12.

Optionally, the plurality of first intermediate decoded feature maps M1 includes the plurality of first un-pooling feature maps P1, the first group of output feature maps M11, and the second group of output feature maps M12. The number of feature maps of the plurality of first un-pooling feature maps P1 is 64. The number of feature maps in the first group of output feature maps M11 is 12. The number of feature maps in the second group of output feature maps M12 is 12. So, the number of feature maps of the plurality of first intermediate decoded feature maps M1 is 88 (e.g. 64+12+12). The plurality of first intermediate decoded feature maps M1 have a same size (e.g. 56×56).

In some embodiments, in the process of processing the plurality of first intermediate decoded feature maps M1 through the second un-pooling block T2 to generate the plurality of second un-pooling feature maps P2, the second un-pooling block T2 is configured to sequentially perform a convolution operation, an activation operation, and an up-sampling operation on the plurality of first intermediate decoded feature maps M1, to generate the plurality of second un-pooling feature maps P2. Optionally, the number of feature maps of the plurality of second un-pooling feature maps P2 is reduced to 44. The plurality of second un-pooling feature maps P2 have a same size (e.g. 112×112).

In some embodiments, in the process of extracting features of the plurality of second un-pooling feature maps P2 using the second densely connected computational module DB2 to generate the plurality of second intermediate decoded feature maps M2, the second densely connected computational module DB2 include a third convolutional block 21c and a fourth convolutional block 21d.

Optionally, the third convolutional block 21c of the second densely connected computational module DB2 is configured to sequentially perform a convolution operation and an activation operation on the plurality of second un-pooling feature maps P2, to generate a third group of output feature maps M21.

Optionally, the fourth convolutional block 21d of the second densely connected computational module DB2 is configured to sequentially perform a convolution operation and an activation operation on the plurality of second un-pooling feature maps P2 and the third group of output feature maps M21, to generate a fourth group of output feature maps M22.

Optionally, the plurality of second intermediate decoded feature maps M2 includes the plurality of second un-pooling feature maps P2, the third group of output feature maps M21, and the fourth group of output feature maps M22. The number of feature maps of the plurality of second un-pooling feature maps P2 is 44. The number of feature maps in the third group of output feature maps M21 is 12. The number of feature maps in the fourth group of output feature maps M22 is 12. So, the number of feature maps of the plurality of second intermediate decoded feature maps M2 is 68 (e.g. 44+12+12). The plurality of second intermediate decoded feature maps M2 have a same size (e.g. 112×112).

In some embodiments, in the process of processing the plurality of second intermediate decoded feature maps M2 through the third un-pooling block T3 to generate the plurality of third un-pooling feature maps P3, the third un-pooling block T3 is configured to sequentially perform a convolution operation, an activation operation, and an up-sampling operation on the plurality of second intermediate decoded feature maps M2, to generate the plurality of third un-pooling feature maps P3. Optionally, the number of feature maps of the plurality of third un-pooling feature maps P3 is reduced to 34. The plurality of third un-pooling feature maps P3 have a same size (e.g. 224×224).

In some embodiments, in the process of extracting features of the plurality of third un-pooling feature maps P3 using the third densely connected computational module DB3 to generate the plurality of third intermediate decoded feature maps M3, the third densely connected computational module DB3 includes a fifth convolutional block 21e, and a sixth convolutional block 21f.

Optionally, the fifth convolutional block 21e of the third densely connected computational module DB3 is configured to sequentially perform a convolution operation and an activation operation on the plurality of third un-pooling feature maps P3, to generate a fifth group of output feature maps M31.

Optionally, the sixth convolutional block 21f of the third densely connected computational module DB3 is configured to sequentially perform a convolution operation and an activation operation on the plurality of third un-pooling feature maps P3 and the fifth group of output feature maps M31, to generate a sixth group of output feature maps M32.

Optionally, the plurality of third intermediate decoded feature maps M3 includes the plurality of third un-pooling feature maps P3, the fifth group of output feature maps M31, and the sixth group of output feature maps M32. The number of feature maps of the plurality of third un-pooling feature maps P3 is 34. The number of feature maps in the fifth group of output feature maps M31 is 12. The number of feature maps in the sixth group of output feature maps M32 is 12. So, the number of feature maps of the plurality of third intermediate decoded feature maps M3 is 58 (e.g. 34+12+12). The plurality of third intermediate decoded feature maps M3 have a same size (e.g. 224×224).

In some embodiments, in the process of converting the plurality of third intermediate decoded feature maps M3 from a feature space into an image space using the output layer OP, to generate the output image F2, the output layer OP is configured to convert the plurality of third intermediate decoded feature maps M3 from a feature space into an image space, to generate the output image F2. Optionally, the output image F2 includes three color channels, e.g. a red channel R, a green channel G, and a blue channel B.

In some embodiments, convolutional kernels of a convolutional layer are different. In one example, convolutional kernels of a convolutional layer in the feature extraction sub-network 101 are different. In another example, convolutional kernels of a convolutional layer in the decoder sub-network 103 are different. In some embodiments, at least two convolutional kernels of the convolutional layer are the same. In one example, at least two convolutional kernels of a convolutional layer of the feature extraction sub-network 101 are the same. In another example, at least two convolutional kernels of a convolutional layer of the decoder sub-network 103 are the same.

In some embodiments, the feature extraction sub-network 101 includes a plurality of pooling blocks. Optionally, the plurality of pooling blocks of the feature extraction sub-network 101 respectively correspond to the plurality of un-pooling blocks of the decoder sub-network 103. Referring to FIG. 6A, in some embodiments, the feature extraction sub-network 101 includes a first pooling block PB1, a second pooling block PB2, and a third pooling block PB3. Optionally, the first pooling block PB1 includes a first pooling layer PL1. The second pooling block PB2 includes a second pooling layer PL2. The third pooling block PB3 includes a third pooling layer PL3. For example, the first pooling block PB1 corresponds to the third un-pooling block T3. The second pooling block PB2 corresponds to the third un-pooling block T2. The third pooling block PB3 corresponds to the first un-pooling block T1.

In some embodiments, the feature extraction sub-network 101 further includes first convolutional layer group CP1, a second convolutional layer group CP2, a third convolutional layer group CP3, a fourth convolutional layer group CP4. Optionally, the first pooling layer PL1 is between the first convolutional layer group CP1 and the second convolutional layer group CP2; the second pooling layer PL2 is between the second convolutional layer group CP2 and the third convolutional layer group CP3; and the third pooling layer PL3 is between the third convolutional layer group CP3 and the fourth convolutional layer group CP4.

In some embodiments, the feature extraction sub-network 101 can adopts a first 8 layers of a pre-trained VGG16 network. Optionally, the plurality of style feature maps include feature maps output from an ReLu4_1-th layer of the VGG16 network. Optionally, the plurality of content features include feature maps output from the ReLu4_1-th layer of the VGG16 network.

For example, the plurality of style feature maps are generated by extracting features from the style image using feature extraction sub-network 101. The plurality of content feature maps are generated by extracting features from the input image using feature extraction sub-network 101.

In some embodiments, the feature extraction sub-network 101 can adopts a first 14 layers of a pre-trained VGG19 network. Optionally, the plurality of style feature maps include feature maps output from an ReLu5_2-th layer of the VGG19 network. Optionally, the plurality of content features include feature maps output from the ReLu5_2-th layer of the VGG19 network.

As used herein, the term "VGG16 network", also known as "OxfordNet" is a convolutional neural network developed by Visual Geometry Group of University of Oxford. The VGG16 network includes 16 convolutional layers. similarly, the VGG19 network includes 19 convolutional layers.

In some embodiments, the VGG16 network includes a first group of convolutional layers, a first pooling layer, a second group of convolutional layers, a second pooling layer, a third group of convolutional layers, a third pooling layer, a fourth group of convolutional layers, a fourth pooling layer, and a fully connected layer.

Optionally, the first group of convolutional layers includes two convolutional layers and two active layers. the number of 3×3 convolutional kernels in a respective one of the two convolutional layers is 64. Optionally, the second group of convolutional layers includes two convolutional layers and two active layers. The number of 3×3 convolutional kernels of a respective one of the two convolutional layers is 128. Optionally, the third group of convolutional layers includes three convolutional layers and three active layers. The number of the 3×3 convolutional kernel of a respective one of the three convolutional layers is 256. Optionally, the fourth group of convolutional layers includes three convolutional layers and three active layers. The number of 3×3 convolutional kernels of a respective one of the three convolutional layers is 512. Optionally, the ReLu4_1-th layer of the VGG16 network represents the first active layer in the fourth group convolutional layers.

Referring to FIG. 2B and FIG. 6A, in the feature extraction sub-network 101, the plurality of convolutional layer groups includes the first convolutional layer group CP1, the second convolutional layer group CP2, the third convolutional layer group CP3, the fourth convolutional layer group CP4. A respective one of the plurality of convolutional layer groups is configured to extract style features from the style image. The style features represent relationships between feature maps from different layers of the convolutional neural network. The style features includes texture information, color information. For example, texture information showing correlations between feature maps, has nothing to do with locations.

In some embodiments, a respective one of the plurality of convolutional layer groups is configured to extract content features from the input image. The content features show an arrangement of objects in the entire image. For example, the content features include content information of the input image.

In some embodiments, the first convolutional layer group CP1 includes two convolutional layers and two active layers; the second convolutional layer group CP2 includes two convolutional layers and two active layers; the third convolutional layer group CP3 includes three convolutional layers and three active layers; and the fourth convolutional layer group includes one convolutional layer and one active layer.

In some embodiments, in the feature extraction sub-network 101, the plurality of pooling layers includes the first pooling layer PL1, the second pooling layer PL2, the third pooling layer PL3. The plurality of pooling layers can use down-sampling operation to sample the feature maps. Optionally, a respective one of the plurality of pooling layers is configured to perform a down-sampling operation on the outputs from a respective one of the plurality of convolutional layer groups. For example, the first pooling layer PL1 is configured to perform a down-sampling operation on the outputs from the first convolutional layer group CP1.

In some embodiments, the plurality of pooling layers can reduce the amount of data of the feature maps by reducing the sizes of the feature maps. The number of the feature maps is kept the same as prior to the down-sampling operation.

Various appropriate methods may be used in a down-sampling operation. Examples of methods suitable to be used in a down-sampling operation include, but are not limited to, max pooling, average pooling, stochastic pooling, under-sampling (e.g. decimation which selects pixels in fixed positions), demuxout (e.g. splitting the input image into multiple smaller images).

In some embodiments, the plurality of pooling blocks of the feature extraction sub-network 101 respectively corresponding to the plurality of un-pooling blocks of the decoder sub-network 103 means up-sampling factors of a respective one of the plurality of pooling layers in the plurality of pooling blocks of the feature extraction sub-network 101 respectively corresponding to down-sampling factors of a respective one of the plurality of un-pooling layers in the plurality of un-pooling blocks of the decoder sub-network 103.

In some embodiments, referring to FIG. 6A and FIG. 5C, the third pooling block PB3 corresponds to the first un-pooling block T1. The third pooling block PB3 include the third pooling layer PL3, the first un-pooling block T3 includes first un-pooling layer 213. The third pooling layer PL3 corresponds to first un-pooling layer 213. For example, the down-sampling factor of the third pooling layer PL3 is Q, the third pooling layer PL3 can reduce the amount of data of the feature maps input in the third pooling layer PL3 by Q times. The up-sampling layer factor of the first un-pooling layer 213 is 1/Q, the first un-pooling layer 213 can increase the amount of data of the feature maps input in the first un-pooling layer 213 by Q times. Optionally, the second pooling layer PL2 of the second pooling block PB2 corresponds to the second un-pooling layer of the second un-pooling block T2. Optionally, the first pooling layer PL1 of the first pooling block PB1 corresponds to the third un-pooling layer of third un-pooling block T3.

In some embodiments, the number of the plurality of pooling layers can be different from the number of the plurality of un-pooling layer, as long as the output image from the convolutional neural network 100 has a size equivalent to the size of the input image.

Figure 7:
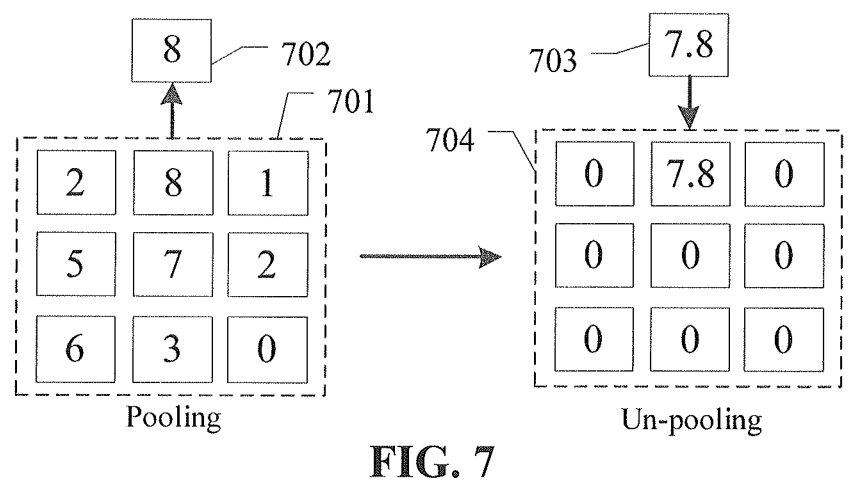
FIG. 7 is a schematic diagram illustrating a pooling process and an un-pooling process in some embodiments according to the present disclosure.

FIG. 7 is a schematic diagram illustrating a pooling process and an un-pooling process in some embodiments according to the present disclosure. Referring to FIG. 7, a left part of the FIG. 7 shows a pooling operation, and a right part of the FIG. 7 shows an un-pooling operation. A pooling operation includes a down-sampling operation. An un-pooling operation includes an up-sampling operation.

Referring to the left part of FIG. 7, in some embodiments, in a pooling operation, a size of a first input feature map 701 is 3×3. A respective pixel of the 9 pixels of the first input feature map 701 has a value. A coordinate of a pixel having a maximum value among the 9 pixels is (0, 1), and the maximum value of the pixel having the maximum value is 8.

Optionally, a pooling operation adopts max-pooling, and a down-sampling factor used in the max-pooling is a 3×3 matrix. For example, the pooling operation is performed on the first input feature map 701 to generate a first output feature map 702. A size of the first output feature map 702 is 1×1. The first output feature 702 has one pixel, and the value of the one pixel of the first output feature 702 is 8.

Referring to the right part of FIG. 7, in some embodiments, a size of a second input feature map 703 is 1×1. The size of the second input feature map 703 is going to be enlarged to a 3×3 size, which can be achieved by an un-pooling operation.

In some embodiments, when an un-pooling layer is performing an un-pooling operation, the un-pooling layer need to obtain parameters of a pooling operation performed by a corresponding pooling layer, for example, the parameters of the pooling operation includes coordinates (0, 1) of a maximum value.

In the un-pooling operation, an up-sampling factor is a 3-3 matrix. For example, the un-pooling operation correspond to a previous pooling operation. In the previous pooling operation, the coordinate of a pixel having a maximum value is obtained. In the un-pooling operation, the coordinate of the pixel having the maximum value among pixels is used. For example, the coordinate of the pixel having the maximum value among pixels is (0, 1). A max active value (e.g. 7.8) is filled in the pixel having the coordinate (0, 1), and the remaining pixels of the 9 pixels are filled with 0, so, a second output feature map 704 is generated, and the second output feature map 704 has a 3×3 size.

In some embodiments, referring to FIG. 2B, FIG. 3, and FIG. 6A, the process of extracting style features of the style image F0 to generate the plurality of style feature maps F11 using the feature extraction sub-network 101 includes extracting style features of the style image F0 using the first convolutional layer group CP1 to generate a plurality of first intermediate style feature maps FS11; down-sampling the plurality of first intermediate style feature maps FS11 using the first pooling layer PL1 to generate a plurality of first pooling style feature maps PS1; extracting style features of the plurality of first pooling style feature maps PS1 using the second convolutional layer group CP2 to generate a plurality of second intermediate style feature maps FS21; down-sampling the plurality of second intermediate style feature maps FS21 using the second pooling layer PL2 to generate a plurality of second pooling style feature maps PS2; extracting style features of the plurality of second pooling style feature maps PS2 using the third convolutional layer group CP3 to generate a plurality of third intermediate style feature maps FS31; down-sampling the plurality of third intermediate style feature maps FS31 using the third pooling layer PL3 to generate a plurality of third pooling style feature maps PS3; and extracting style features of the plurality of third pooling style feature maps PS3 using the fourth convolutional layer group CP4 to generate a plurality of fourth intermediate style feature maps FS4. Optionally, the plurality of style feature maps F11 includes the plurality of fourth intermediate style feature maps FS4.

Figure 6B:
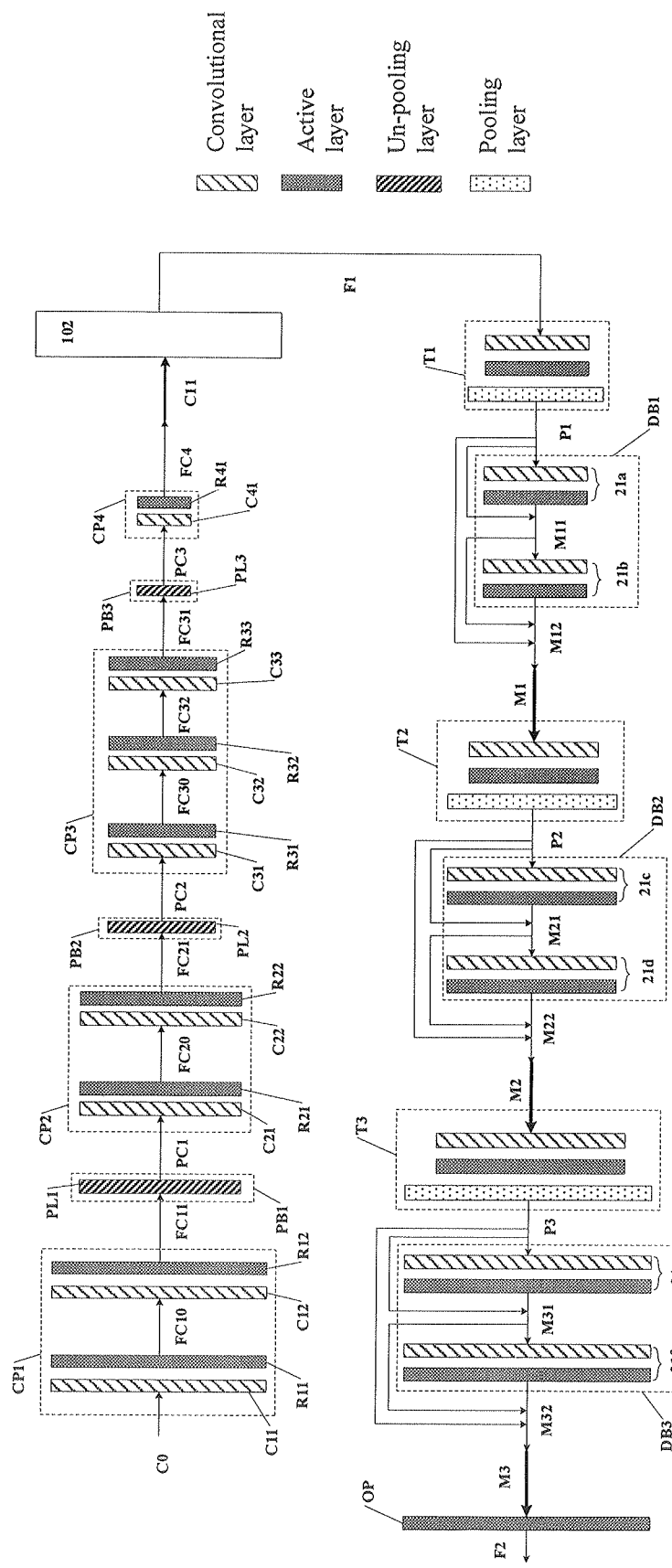
FIG. 6B is a schematic diagram illustrating a structure of a convolutional neural network in some embodiments according to the present disclosure.

FIG. 6B is a schematic diagram illustrating a structure of a convolutional neural network in some embodiments according to the present disclosure. Referring to FIG. 2B, FIG. 3, and FIG. 6B, the process of extracting content features of the input image C0 to generate the plurality of content feature maps C11 using the feature extraction sub-network 101 includes extracting content features of the input image C0 using the first convolutional layer group CP1 to generate a plurality of first intermediate content feature maps FC11; down-sampling the plurality of first intermediate content feature maps FC11 using the first pooling layer PL1 to generate a plurality of first pooling content feature maps PC1; extracting content features of the plurality of first pooling content feature maps PC1 using the second convolutional layer group CP2 to generate a plurality of second intermediate content feature maps FC21; down-sampling the plurality of second intermediate content feature maps FC21 using the second pooling layer PL2 to generate a plurality of second pooling content feature maps PC2; extracting content features of the plurality of second pooling content feature maps PC2 using the third convolutional layer group CP3 to generate a plurality of third intermediate content feature maps FC31; down-sampling the plurality of third intermediate content feature maps FC31 using the third pooling layer PL3 to generate a plurality of third pooling content feature maps PC3; and extracting content features of the plurality of third pooling content feature maps PC3 using the fourth convolutional layer group CP4 to generate a plurality of fourth intermediate content feature maps FC4. Optionally, the plurality of content feature maps C11 include the plurality of fourth intermediate content feature maps FC4.

In some embodiments, the input image C0 has a same size as the style image F0. In one example, both the size of the input image C0 and the size of the style image F0 are 224×224. In another example, both the size of the input image C0 and the size of the style image F0 are 256×256. Optionally, the input image C0 has a size different from that of the style image F0. For example, the input image C0 has an 800×800 size, and the style image F0 has a 256×256 size.

In some embodiments, the style image F0 has a 224×224 size. Optionally, the style image F0 includes three color channels, e.g. a red color channel R, a green color channel G, and a blue color channel B.

In some embodiments, referring to FIG. 6A, the first convolutional layer group CP1 includes a first extracting convolutional layer C11, a second extracting convolutional layer C12, a first extracting active layer R11, and a second extracting active layer R12. Optionally, a respective one extracting convolutional layer of the first convolutional layer group CP1 has a plurality of 3×3 convolutional kernels. The number of the plurality of 3×3 convolutional kernels in the first convolutional layer group CP1 is 64.

In some embodiments, the first extracting convolutional layer C11 and the first extracting active layer R11 are configured to extract style features of the style image F0 to generate a plurality of fifth intermediate style feature maps FS10. In some embodiments, the second extracting convolutional layer C12 and the second extracting active layer R12 are configured to extract style features of the plurality of fifth intermediate style feature maps FS10, to generate the plurality of first intermediate style feature maps FS11.

Optionally, then number of the plurality of fifth intermediate style feature maps FS10 is 64. Optionally, the plurality of fifth intermediate style feature maps FS10 have a same size, for example, a size of the respective one of the plurality of fifth intermediate style feature maps FS10 is 224×224. Optionally, the number of the plurality of first intermediate style feature maps FS11 is 64. Optionally, the plurality of first intermediate style feature maps FS11 have a same size, for example, a size of a respective one of the plurality of first intermediate style feature maps FS11 is 224×224.

In some embodiments, the first pooling layer PL1 is configured to perform a down-sampling operation on the plurality of first intermediate style feature maps FS11, to generate the plurality of first pooling style feature maps PS1. Optionally, the plurality of first pooling style feature maps PS1 have a same size.

In some embodiments, the down-sampling factor of the first pooling layer PL1 is a 2×2 matrix having a stride of 2. Optionally, the sizes of the plurality of first intermediate style feature maps FS11 are 224×224. After the down-sampling operation, the plurality of first pooling style feature maps PS1 are generated from the plurality of first intermediate style feature maps FS11, and a respective one of the plurality of first pooling style feature maps PS1 has a size of 112×112. Optionally, the number of the plurality of first intermediate style feature maps FS11 is 64, the number of the plurality of first pooling style feature maps PS1 is also 64. For example, the number of the plurality of first intermediate style feature maps FS11 and the number of the plurality of first pooling style feature maps PS1 are the same. A size of a respective one of the plurality of first pooling style feature maps PS1 is 0.25 times of a size of a respective one of the plurality of first intermediate style feature maps FS11.

In some embodiments, the second convolutional layer group CP2 includes a third extracting convolutional layer C21, a fourth extracting convolutional layer C22, a third extracting active layer R21, and a fourth extracting active layer R22. Optionally, a respective one extracting convolutional layer of the second convolutional layer group CP2 has a plurality of 3×3 convolutional kernels. The number of the plurality of 3×3 convolutional kernels in the second convolutional layer group CP2 is 128.

In some embodiments, the third extracting convolutional layer C21 and the third extracting active layer R21 are configured to extract style features of the plurality of first pooling style feature maps PS1 to generate a plurality of sixth intermediate style feature maps FS20. In some embodiments, the fourth extracting convolutional layer C22 and the fourth extracting active layer R22 are configured to extract style features of the plurality of sixth intermediate style feature maps FS20, to generate the plurality of second intermediate style feature maps FS21.

Optionally, the number of the plurality of sixth intermediate style feature maps FS20 is 128. Optionally, the plurality of sixth intermediate style feature maps FS20 have a same size, for example, a size of a respective one of the plurality of sixth intermediate style feature maps FS20 is 112×112. Optionally, the number of the plurality of second intermediate style feature maps FS21 is 128. Optionally, the plurality of second intermediate style feature maps FS21 have a same size, for example, a size of a respective one of the plurality of second intermediate style feature maps FS21 is 112×112.

In some embodiments, the second pooling layer PL2 is configured to perform a down-sampling operation on the plurality of second intermediate style feature maps FS21, to generate the plurality of second pooling style feature maps PS2. Optionally, the plurality of second pooling style feature maps PS2 have a same size.

In some embodiments, the down-sampling factor of the second pooling layer PL2 is a 2×2 matrix having a stride of 2. Optionally, the sizes of the plurality of second intermediate style feature maps FS21 are 112×112. After the down-sampling operation, the plurality of second pooling style feature maps PS2 are generated from the plurality of second intermediate style feature maps FS21, a respective one of the plurality of second pooling style feature maps PS2 has a size of 56×56. Optionally, the number of the plurality of second intermediate style feature maps FS21 is 128, the number of the plurality of second pooling style feature maps PS2 is also 128. For example, the number of the plurality of second intermediate style feature maps FS21 and the number of the plurality of second pooling style feature maps PS2 are the same. A size of a respective one of the plurality of second pooling style feature maps PS2 is 0.25 times of a size of a respective one of the plurality of second intermediate style feature maps FS21.

In some embodiments, the third convolutional layer group CP3 includes a fifth extracting convolutional layer C31, a sixth extracting convolutional layer C32, a seventh extracting convolutional layer C33, a fifth extracting active layer R31, a sixth extracting active layer R32, and a seventh extracting active layer R33. Optionally, a respective one extracting convolutional layer of the third convolutional layer group CP3 has a plurality of 3×3 convolutional kernels. The number of the plurality of 3×3 convolutional kernels in the third convolutional layer groups CP3 is 256.

In some embodiments, the fifth extracting convolutional layer C31 and the fifth extracting active layer R31 are configured to extract style features of the plurality of second pooling style feature maps PS2 to generate a plurality of seventh intermediate style feature maps FS30. In some embodiments, the sixth extracting convolutional layer C32 and the sixth extracting active layer R32 are configured to extract style features of the plurality of seventh intermediate style feature maps FS30, to generate a plurality of eighth intermediate style feature maps FS32. In some embodiments, the seventh extracting convolutional layer C33 and the seventh extracting active layer R33 are configured to extract style features of the plurality of eighth intermediate style feature maps FS32, to generate the plurality of third intermediate style feature maps FS31.

Optionally, the number of the plurality of seventh intermediate style feature maps FS30 is 256. Optionally, the plurality of seventh intermediate style feature maps FS30 have a same size, for example, a size of a respective one of the plurality of seventh intermediate style feature maps FS30 is 56×56. Optionally, the number of the plurality of third intermediate style feature maps FS31 is 256. Optionally, the plurality of third intermediate style feature maps FS31 have a same size, for example, a size of a respective one of the plurality of third intermediate style feature maps FS31 is 56×56.

In some embodiments, the third pooling layer PL3 is configured to perform a down-sampling operation on the plurality of third intermediate style feature maps FS31, to generate the plurality of third pooling style feature maps PS3. Optionally, the plurality of third pooling style feature maps PS3 have a same size.

In some embodiments, the down-sampling factor of the third pooling layer PL3 is a 2×2 matrix having a stride of 2. Optionally, the sizes of the plurality of third intermediate style feature maps FS31 are 56×56. After the down-sampling operation, the plurality of third pooling style feature maps PS3 are generated from the plurality of third intermediate style feature maps FS31, a respective one of the plurality of third pooling style feature maps PS3 has a size of 28×28. Optionally, the number of the plurality of third intermediate style feature maps FS31 is 256, the number of the plurality of third pooling style feature maps PS3 is also 256. For example, the number of the plurality of third intermediate style feature maps FS31 and the number of the plurality of third pooling style feature maps PS3 are the same. A size of a respective one of the plurality of third pooling style feature maps PS3 is 0.25 times of a size of a respective one of the plurality of third intermediate style feature maps FS31.

In some embodiments, the fourth convolutional layer group CP4 includes an eighth extracting convolutional layer C41, and an eight extracting active layer R41. Optionally, a respective one extracting convolutional layer of the fourth convolutional layer group CP4 has a plurality of 3×3 convolutional kernels. The number of the plurality of 3×3 convolutional kernels in the fourth convolutional layer groups CP4 is 512.

In some embodiments, the eighth extracting convolutional layer C41 and the eighth extracting active layer R41 are configured to extract style features of the plurality third pooling style feature maps PS3 to generate the plurality of fourth intermediate style feature maps FS4.

Optionally, the number of the plurality of fourth intermediate style feature maps FS4 is 512. Optionally, the plurality of fourth intermediate style feature maps FS4 have a same size, for example, a size of a respective one of the plurality of fourth intermediate style feature maps FS4 is 28×28.

In some embodiments, the plurality of style feature maps F11 includes the plurality of fourth intermediate style feature maps FS4. So, the number of the plurality of style feature maps F11 is 512. The plurality of style feature maps F11 have a same size, for example, a size of a respective one of the plurality of style feature maps F11 is 28×28.

In some embodiments, the input image C0 has a 224×224 size. Optionally, the input image C0 includes three color channels, e.g. a red color channel R, a green color channel G. and a blue color channel B.

In some embodiments, referring to FIG. 6B, the first convolutional layer group CP1 includes a first extracting convolutional layer C11, a second extracting convolutional layer C12, a first extracting active layer R11, and a second extracting active layer R12. Optionally, a respective one extracting convolutional layer of the first convolutional layer group CP1 has a plurality of 3×3 convolutional kernels. The number of the plurality of 3×3 convolutional kernels in the first convolutional layer group CP1 is 64.

In some embodiments, the first extracting convolutional layer C11 and the first extracting active layer R11 are configured to extract content features of the input image C0 to generate a plurality of fifth intermediate content feature maps FC10. In some embodiments, the second extracting convolutional layer C12 and the second extracting active layer R12 are configured to extract content features of the plurality of fifth intermediate content feature maps FC10, to generate the plurality of first intermediate content feature maps FC11.

Optionally, the number of the plurality of fifth intermediate content feature maps FC10 is 64. Optionally, the plurality of fifth intermediate content feature maps FC10 have a same size, for example, a size of the respective one of the plurality of fifth intermediate content feature maps FC10 is 224×224. Optionally, the number of the plurality of first intermediate content feature maps FC11 is 64. Optionally, the plurality of first intermediate content feature maps FC11 have a same size, for example, a size of a respective one of the plurality of first intermediate content feature maps FC11 is 224×224.

In some embodiments, the first pooling layer PL1 is configured to perform a down-sampling operation on the plurality of first intermediate content feature maps FC11, to generate the plurality of first pooling content feature maps PC1. Optionally, the plurality of first pooling content feature maps PC1 have a same size.

In some embodiments, the down-sampling factor of the first pooling layer PL1 is a 2×2 matrix having a stride of 2. Optionally, the sizes of the plurality of first intermediate content feature maps FC11 are 224×224. After the down-sampling operation, the plurality of first pooling content feature maps PC1 are generated from the plurality of first intermediate content feature maps FC11, and a respective one of the plurality of first pooling content feature maps PC1 has a size of 112×112. Optionally, the number of the plurality of first intermediate content feature maps FC11 is 64, the number of the plurality of first pooling content feature maps PC1 is also 64. For example, the number of the plurality of first intermediate content feature maps FC11 and the number of the plurality of first pooling content feature maps PC1 are the same. A size of a respective one of the plurality of first pooling content feature maps PC1 is 0.25 times of a size of a respective one of the plurality of first intermediate content feature maps FC11.

In some embodiments, the second convolutional layer group CP2 includes a third extracting convolutional layer C21, a fourth extracting convolutional layer C22, a third extracting active layer R21, and a fourth extracting active layer R22. Optionally, a respective one extracting convolutional layer of the second convolutional layer group CP2 has a plurality of 3×3 convolutional kernels. The number of the plurality of 3×3 convolutional kernels in the second convolutional layer group CP2 is 128.

In some embodiments, the third extracting convolutional layer C21 and the third extracting active layer R21 are configured to extract content features of the plurality of first pooling content feature maps PC1 to generate a plurality of sixth intermediate content feature maps FC20. In some embodiments, the fourth extracting convolutional layer C22 and the fourth extracting active layer R22 are configured to extract content features of the plurality of sixth intermediate content feature maps FC20, to generate the plurality of second intermediate content feature maps FC21.

Optionally, the number of the plurality of sixth intermediate content feature maps FC20 is 128. Optionally, the plurality of sixth intermediate content feature maps FC20 have a same size, for example, a size of a respective one of the plurality of sixth intermediate content feature maps FC20 is 112×112. Optionally, the number of the plurality of second intermediate content feature maps FC21 is 128. Optionally, the plurality of second intermediate content feature maps FC21 have a same size, for example, a size of a respective one of the plurality of second intermediate content feature maps FC21 is 112×112.

In some embodiments, the second pooling layer PL2 is configured to perform a down-sampling operation on the plurality of second intermediate content feature maps FC21, to generate the plurality of second pooling content feature maps PC2. Optionally, the plurality of second pooling content feature maps PC2 have a same size.

In some embodiments, the down-sampling factor of the second pooling layer PL2 is a 2×2 matrix having a stride of 2. Optionally, the sizes of the plurality of second intermediate content feature maps FC21 are 112×112. After the down-sampling operation, the plurality of second pooling content feature maps PC2 are generated from the plurality of second intermediate content feature maps FC21, a respective one of the plurality of second pooling content feature maps PC2 has a size of 56×56. Optionally, the number of the plurality of second intermediate content feature maps FC21 is 128, the number of the plurality of second pooling content feature maps PC2 is also 128. For example, the number of the plurality of second intermediate content feature maps FC21 and the number of the plurality of second pooling content feature maps PC2 are the same. A size of a respective one of the plurality of second pooling content feature maps PC2 is 0.25 times of a size of a respective one of the plurality of second intermediate content feature maps FC21.

In some embodiments, the third convolutional layer group CP3 includes a fifth extracting convolutional layer C31, a sixth extracting convolutional layer C32, a seventh extracting convolutional layer C33, a fifth extracting active layer R31, a sixth extracting active layer R32, and a seventh extracting active layer R33. Optionally, a respective one extracting convolutional layer of the third convolutional layer group CP3 has a plurality of 3×3 convolutional kernels. The number of the plurality of 3×3 convolutional kernels in the third convolutional layer groups CP3 is 256.

In some embodiments, the fifth extracting convolutional layer C31 and the fifth extracting active layer R31 are configured to extract content features of the plurality of second pooling content feature maps PC2 to generate a plurality of seventh intermediate content feature maps FC30. In some embodiments, the sixth extracting convolutional layer C32 and the sixth extracting active layer R32 are configured to extract content features of the plurality of seventh intermediate content feature maps FC30, to generate a plurality of eighth intermediate content feature maps FC32. In some embodiments, the seventh extracting convolutional layer C33 and the seventh extracting active layer R33 are configured to extract content features of the plurality of eighth intermediate content feature maps FC32, to generate the plurality of third intermediate content feature maps FC31.

Optionally, the number of the plurality of seventh intermediate content feature maps FC30 is 256. Optionally, the plurality of seventh intermediate content feature maps FC30 have a same size, for example, a size of a respective one of the plurality of seventh intermediate content feature maps FC30 is 56×56. Optionally, the number of the third intermediate content feature maps FC31 is 256. Optionally, the plurality of third intermediate content feature maps FC31 have a same size, for example, a size of a respective one of the plurality of third intermediate content feature maps FC31 is 56×56.

In some embodiments, the third pooling layer PL3 is configured to perform a down-sampling operation on the plurality of third intermediate content feature maps FC31, to generate the plurality of third pooling content feature maps PC3. Optionally, the plurality of third pooling content feature maps PC3 have a same size.

In some embodiments, the down-sampling factor of the third pooling layer PL3 is a 2×2 matrix having a stride of 2. Optionally, the sizes of the plurality of third intermediate content feature maps FC31 are 56×56. After the down-sampling operation, the plurality of third pooling content feature maps PC3 are generated from the plurality of third intermediate content feature maps FC31, a respective one of the plurality of third pooling content feature maps PC3 has a size of 28×28. Optionally, the number of the plurality of third intermediate content feature maps FC31 is 256, the number of the plurality of third pooling content feature maps PC3 is also 256. For example, the number of the plurality of third intermediate content feature maps FC31 and the number of the plurality of third pooling content feature maps PC3 are the same. A size of a respective one of the plurality of third pooling content feature maps PC3 is 0.25 times of a size of a respective one of the plurality of third intermediate content feature maps FC31.

In some embodiments, the fourth convolutional layer group CP4 includes an eighth extracting convolutional layer C41, and an eight extracting active layer R41. Optionally, a respective one extracting convolutional layer of the fourth convolutional layer group CP4 has a plurality of 3×3 convolutional kernels. The number of the plurality of 3×3 convolutional kernels in the fourth convolutional layer groups CP4 is 512.

In some embodiments, the eighth extracting convolutional layer C41 and the eighth extracting active layer R41 are configured to extract content features of the plurality third pooling content feature maps PC3 to generate the plurality of fourth intermediate content feature maps FC4.

Optionally, the number of the plurality of fourth intermediate content feature maps FC4 is 512. Optionally, the plurality of fourth intermediate content feature maps FC4 have a same size, for example, a size of a respective one of the plurality of fourth intermediate content feature maps FC4 is 28×28.

In some embodiments, the plurality of content feature maps C11 includes the plurality of fourth intermediate content feature maps FC4. So, the number of the plurality of content feature maps C11 is 512. The plurality of content feature maps C11 have a same size, for example, a size of a respective one of the plurality of content feature maps C11 is 28×28.

In some embodiment, an extracting active layer in the feature extraction sub-network 101 includes ReLU functions.

In some embodiments, in the feature extraction sub-network, a feature map represents a feature channel. For example, the number of the plurality of fourth intermediate style feature maps FS4 is 512, the number of feature channels corresponding to the plurality of fourth intermediate style feature maps FS4 is also 512.

In some embodiments, referring to FIG. 2B, FIG. 3, and FIG. 6B, in the process of morphing the plurality of style feature maps F11 respectively with the plurality of content feature maps C11 to generate the plurality of output feature maps F1 using the morpher 102, the morpher 102 is configured to perform a normalization operation on each of the plurality of content feature maps C11. An average value and a variance value of each of the plurality of content feature maps C11 are generated, an average value and a variance value of each of the plurality of style feature maps F11 are generated. The average value and the variance value of each of the plurality of content feature maps C11 are matched with the average value and the variance value of each of the plurality of style feature maps F11, thereby transferring the style features of the style image F0 to the input image C0.

In some embodiments, the plurality of output feature maps F1 can be represented using a following function:

$$A(x, y) = \sigma(y) \cdot \left( \frac{x - \mu(x)}{\sigma(x)} \right) + \mu(y)$$

wherein A(x, y) represents a three dimensional matrix formed by the plurality of output feature maps F1, x represents a three dimensional matrix formed by the plurality of content feature maps C11, y represents a three dimensional matrix formed by the plurality of style feature maps F11, $\mu(x)$ represents a three dimensional matrix constituted by a plurality of average values respectively derived from the plurality of content feature maps C11 (e.g. a respective one of the plurality of content feature maps C11 has a respective average value), $\sigma(x)$ represents a three dimensional matrix constituted by a plurality of variance values respectively derived from the plurality of content feature maps C11 (e.g. a respective one of the plurality of content feature maps C11 has a respective variance value), $\mu(y)$ represents a three dimensional matrix constituted by a plurality of average values respectively derived from the plurality of style feature maps F11 (e.g. a respective one of the plurality of style feature maps F11 has a respective average value), $\sigma(y)$ represents a three dimensional matrix constituted by a plurality of variance values respectively derived from the plurality of style feature maps F11 (e.g. a respective one of the plurality of style feature maps F11 has a respective variance value).

In some embodiments, the number of the plurality of output feature maps F1, the number of the plurality of content feature maps C11, and the number of plurality of style feature maps F11 are the same. For example, the number of the plurality of output feature maps F1, the number of the plurality of content feature maps C11, and the number of plurality of style feature maps F11 are j0, j0 is a positive integer. Optionally, A(x, y) can be described as $[A_1(x_1, y_1), A_2(x_2, y_2), \ldots, A_g(x_g, y_g), \ldots, A_{j0}(x_{j0}, y_{j0})]$, wherein $A_g(x_g, y_g)$ represents a two dimensional matrix, g is an integer, and j0≥g≥1. Optionally, x can be described as $[x_1, x_2, \ldots, x_g, \ldots, x_{j0}]$, wherein $x_{j0}$ represents a two dimensional matrix. Optionally, y can be described as $[y_1, y_2, \ldots, y_g, \ldots, y_{j0}]$, wherein $y_{j0}$ represents a two dimensional matrix. Optionally, $\mu(x)$ can be described as $[\mu_1(x_1), \mu_2(x_2), \ldots, \mu_g(x_g), \ldots, \mu_{j0}(x_{j0})]$, wherein $\mu_g(x_g)$ represents a two dimensional matrix, and $\mu_g(x_g)$ is average values of $x_g$. Optionally, $\sigma(x)$ can be described as $[\sigma_1(x_1), \sigma_2(x_2), \ldots, \sigma_g(x_g), \ldots, \sigma_{j0}(x_{j0})]$, wherein $\sigma_g(x_g)$ represents a two dimensional matrix, and $\sigma_g(x_g)$ is variance values of $x_g$. Optionally. $\mu(y)$ can be described as $[\mu_1(y_1), \mu_2(y_2), \ldots, \mu_g(y_g), \ldots, \mu_{j0}(y_{j0})]$, wherein $\mu_g(y_g)$ represents a two dimensional matrix, and $\mu_g(y_g)$ is average values of $y_g$. Optionally, $\sigma(y)$ can be described as $[\sigma_1(x_1), \sigma_2(x_2), \ldots, \sigma_g(y_g), \ldots, \sigma_{j0}(y_{j0})]$, wherein $\sigma_g(y_g)$ represents a two dimensional matrix, and $\sigma_g(y_g)$ is variance values of $y_g$.

In some embodiments, referring to FIG. 6A, j0 is 512. The plurality of output feature maps F1 have a same size. For example, the respective one of the plurality of output feature maps F1 has a size of 28×28. In some embodiment, the plurality of style feature maps F11 have a same size. For example, the respective one of the plurality of style feature maps F11 has a size of 28×28. In some embodiments, referring to FIG. 6B, the plurality of content feature maps C11 have a same size. For example, the respective one of the plurality of content feature maps C11 has a size of 28×28. So, A(x, y) is a 28×28×512 three dimensional. x is a 28×28×512 three-dimensional matrix. y is a 28×28×512 three-dimensional matrix. $\mu(x)$ is a 28×28×512 three-dimensional matrix. $\sigma(x)$ is a 28×28×512 three-dimensional matrix. $\mu(y)$ is a 28×28×512 three-dimensional matrix. $\sigma(y)$ is a 28×28×512 three-dimensional matrix.

In some embodiments, the morpher 102 can morph a g-th content feature map $x_g$ in the three dimensional matrix formed by the plurality of content feature maps C11 with a g-th style feature maps $y_g$ in the three dimensional matrix formed by the plurality of style feature maps F11 to generate a g-th output feature map $A_g(x_g, y_g)$ in the three dimensional matrix formed by the plurality of output feature maps F1. So, the $A_g(x_g, y_g)$ can be described using the following function:

$$A_g(x_g, y_g) = \sigma_g(y_g) \cdot \left( \frac{x_g - \mu_g(x_g)}{\sigma_g(x_g)} \right) + \mu_g(y_g)$$

In some embodiments, prior to inputting the style image and the input image, the computer-implemented method using a convolutional neural network further includes pre-training the convolutional neural network.

Figure 8:
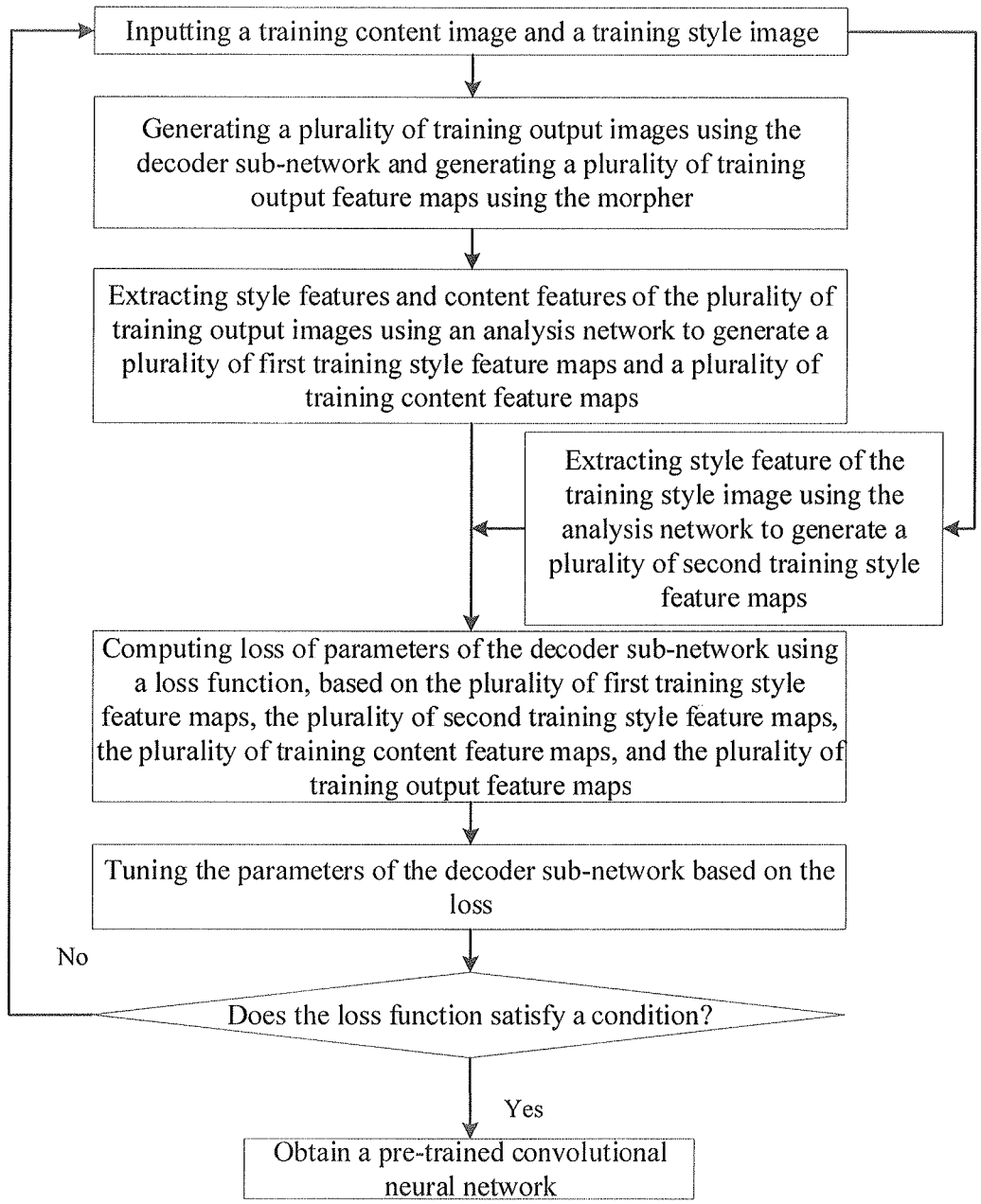
FIG. 8 is a flow chart illustrating a method of pre-training a convolutional neural network in some embodiments according to the present disclosure.

FIG. 8 is a flow chart illustrate a method of pre-training a convolutional neural network in some embodiments according to the present disclosure. Referring to FIG. 8, pre-training the convolutional neural network includes inputting a training content image and a training style image into the convolutional neural network; generating a plurality of training output images using the decoder sub-network and generating a plurality of training output feature maps using the morpher; extracting style features and content features of the plurality of training output images using an analysis network to generate a plurality of first training style feature maps and a plurality of training content feature maps; extracting style feature of the training style image using the analysis network to generate a plurality of second training style feature maps; computing loss of parameters of the decoder sub-network using a loss function, based on the plurality of first training style feature maps, the plurality of second training style feature maps, the plurality of training content feature maps, and the plurality of training output feature maps; tuning the parameters of the decoder sub-network based on the loss.

Optionally, in the process of generating a plurality of training output images using the decoder sub-network and generating a plurality of training output feature maps using the morpher, the plurality of training output images and the plurality of training output feature maps are generated by morphing the training content image with the style of the training style image.

In some embodiments, pre-training the convolutional neural network further includes determining whether the loss function meets a condition. When the loss function meets the condition, a pre-trained convolutional neural network is obtained. When the loss function does not meet the condition, pre-training the convolutional neural network further includes reiterating pre-training the convolutional neural network. For example, when the loss function does not meet the condition, the pre-training process should be repeated from the process of inputting a training content image and a training style image.

Figure 9:
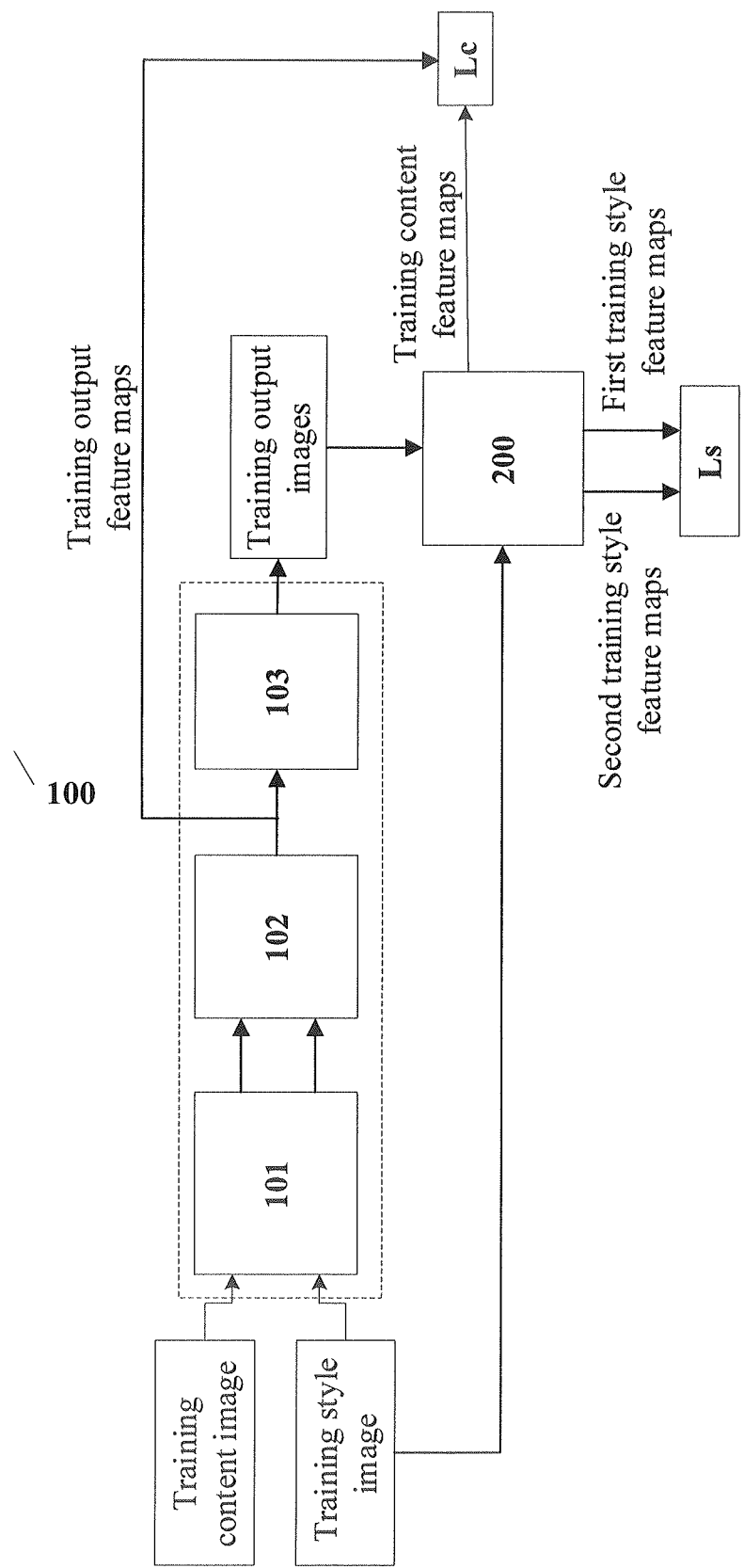
FIG. 9 is a schematic diagram illustrating a structure of a pre-training network pretraining a convolutional neural network in some embodiments according to the present disclosure.

FIG. 9 is a schematic diagram illustrating a structure of a pre-training network pretraining a convolutional neural network in some embodiments according to the present disclosure. Referring to FIG. 9, in some embodiments, a pre-training network includes a convolutional neural network 100, an analysis network 200, and a loss function. Optionally, the loss function is configured to computing loss of parameters of the convolutional neural network 100. Optionally, the parameters of the convolutional neural network 100 can be tuned based on the loss of parameters of the convolutional neural network 100.

In some embodiments, the analysis network 200 and the feature extraction sub-network 101 includes a same structure and same parameters. For example, the analysis network 200 can also adopts a VGG16 network, or a VGG19 network.

In one example, in the pre-training process, the style features can be extracted using some of a plurality of convolutional layers in the analysis network 200. For example, the style features can be extracted using two or three convolutional layers of the analysis network 200. Optionally, the content features can be extracted using one of the plurality of convolutional layers.

In another example, in the pre-training process, the style features can be extracted using one of the plurality of convolutional layers in the analysis network 200. Optionally, the content features can be extracted using some of the plurality of convolutional layers in the analysis network 200.

In some embodiments, the structure and parameters of the analysis network 200 and the structure and parameters of the feature extraction sub-network 101 are at least partially different.

In some embodiments, when the analysis network 200 includes a plurality of layers of the VGG16 network, the plurality of training content feature maps includes feature maps output from the ReLu4_1-th layer of the VGG16 network; the plurality of first training style feature maps includes feature maps output from the ReLu1_1-th layer, the ReLu2_1-th layer, the ReLu3_1-th layer, and the ReLu4_1-th layer of the VGG16 network; the plurality of second training style feature maps includes feature maps output from the ReLu1_1-th layer, the ReLu2_1-th layer, the ReLu3_1-th layer, and the ReLu4_1-th layer of the VGG16 network.

Optionally, the plurality of training content feature maps includes feature maps output from the ReLu4_3-th layer of the VGG16 network. Optionally, the plurality of first training style feature maps includes feature maps output from the ReLu1_2-th layer, the ReLu2_2-th layer, the ReLu3_3-th layer, and the ReLu4_3-th layer of the VGG16 network. Optionally, the plurality of second training style feature maps includes feature maps output from the ReLu1_2-th layer, the ReLu2_2-th layer, the ReLu3_3-th layer, and the ReLu4_3-th layer of the VGG16 network.

In some embodiments, when the analysis network 200 includes a plurality of layers of the VGG19 network, the plurality of training content feature maps includes feature maps output from the ReLu5_2-th layer of the VGG19 network; the plurality of first training style feature maps includes feature maps output from the ReLu1_1-th layer, the ReLu2_1-th layer, the ReLu3_2-th layer, the ReLu4_2-th layer, and the ReLu5_2-th layer of the VGG19 network; the plurality of second training style feature maps includes feature maps output from the ReLu1_1-th layer, the ReLu2_1-th layer, the ReLu3_2-th layer, the ReLu4_2-th layer, and the ReLu5_2-th layer of the VGG19 network.

In some embodiments, a respective one of the plurality of layers configured to output content feature maps in the feature extraction sub-network 101 corresponds to a respective one of the plurality of layers configured to output content feature maps in the analysis network 200. For example, the feature extraction sub-network 101 includes a plurality of layers of a first VGG16 network, and the analysis network 200 includes a plurality of layers of a second VGG16 network. In the feature extraction sub-network 101, feature maps output from a ReLu4_1-th layer of the first VGG16 network are content feature maps. In the analysis network 200, feature maps output from a ReLu4_1-th layer of the second VGG16 network are content feature maps. So, the number of the plurality of training output feature maps generated by the morpher 102 are the same as the number of the plurality of training content feature maps generated by the analysis network 200. And a size of a respective one of the plurality of training output feature maps generated by the morpher 102 is the same as a size of a respective one of the plurality of training content feature maps generated by the analysis network 200.

In some embodiments, a condition used to determine whether the pre-training process should be reiterated is times of pre-training the convolutional neural network. In some embodiments, the condition is the minimum value of a loss of the convolutional neural network when a training content image and the training style image is input.

In some embodiments, in the pre-training process, a lot of sample images should be used to pre-train the convolutional neural network. In some embodiments, reiterating the pre-training can help to tune the parameters in the convolutional neural network. In some embodiments, the pre-training process further includes fine-tuning the convolutional neural network to have more optimized parameters.

In some embodiments, initial parameters of the decoder sub-network 103 are random numbers. For example, the random numbers conform to Gaussian Distribution. Optionally, the initial parameters of the decoder sub-network 103 can adopts pre-trained parameters in an image data base such as ImageNet.

In some embodiments, a loss function can calculate loss based on the initial parameters of the decoder sub-network 103. Optionally, the loss can have a counter-propagation from the output layer of the decoder sub-network 103 to an input layer of the decoder sub-network 103 layer-by-layer, which may distribute the loss to each unit in each layer of the decoder sub-network 103, to obtain an error value for each unit of the decoder sub-network 103. The error value serves as the basis for correcting the parameters of each unit of the decoder sub-network 103. Optionally, an error value can be expressed as a partial derivative of the loss function with respective to the parameters of each unit.

In some embodiments, the feature extraction sub-network 101 uses a plurality of layers of a pre-trained VGG16 network, there is no need to tuning parameters in the feature extraction sub-network 101. And the morpher 102 doesn't include parameters of a network, it is not necessary to pre-train the morpher 102. The pre-training process only includes pre-training decoder sub-network 103 and using the loss to tune the parameters in the decoder sub-network 103.

In some embodiments, the feature extraction sub-network 101 used a non-pretrained neural network, the pre-training process further includes pre-training the feature extraction sub-network 101.

In some embodiments, the pre-training network further includes an optimized function. Optionally, the optimized function can calculate the error value of parameters in the decoder sub-network 103 based on the loss of the parameters in the decoder sub-network 103. Optionally, the parameters in the decoder sub-network 103 is tuned based on the error value of parameters in the decoder sub-network 103. Various appropriate algorithms may be adopted by the optimized function to calculate the error value of parameters in the decoder sub-network 103. Examples of algorithms suitable include, but are not limited to, stochastic gradient descent (SGD), and batch gradient descent (BGD).

In some embodiments, the training content image can be selected from a group consisting of all types of images. Optionally, the training content images can be images taken by digital cameras or mobile phones. Optionally, the training content images can be images of people, images of animals, images of plants, and image of sceneries.

In some embodiments, the training style images can be arts of art masters, such as Monet, Van Gogh, and Picasso. Optionally, the training style images can be arts drawn with different paints including ink painting, oil painting, and sketching.

Referring to FIG. 8, in some embodiments, the loss function includes a content loss function Lc, and a style loss function Ls. Optionally, the content loss function Lc is configured to describe the content differences between the training content image and the plurality of training output images. Optionally, the style loss function Ls is configured to describe the style difference between the training style image and the plurality of training output images.

In some embodiments, the loss function can be expressed as follows:

$$L_t = \alpha \cdot L_c + \beta \cdot L_s$$

wherein Lc represents the content loss function, Ls represents the style loss function α represents a weight of the content loss function Lc, β represents a weight of the style loss function Ls.

In some embodiments, the loss includes a content loss and a style loss. Optionally, the content loss is a Euclidean distance between the plurality of training content feature maps and the plurality of training output feature maps. Optionally, the content loss function Lc can be expressed as follows:

$$L_c = \frac{1}{2 \times C1} \times \|f_{11}(g(t)) - f_2(t)\|_2$$

wherein t represents the training content image, g(t) represents the plurality of training output images, $f_{11}(g(t))$ represents a three dimensional matrix formed by the plurality of training content feature maps, $f_2(t)$ represents a three dimensional matrix formed by the plurality of training output feature maps, and C1 is a constant used to perform normalization.

For example, the number of the plurality of training content feature maps is equivalent to the number of the plurality of training output feature maps. And a respective one of the plurality of training content feature maps corresponds to a respective one of the plurality of training output feature maps.

In some embodiments, the morpher 102 only deliver the average values and the variance values of the style features. The style loss is calculated by matching the average values and the variance values. Optionally, the style loss function Ls is expressed as follows:

$$L_s = \sum_{k=1}^{4} \|\mu_k(f_{12}(g(t))) - \mu_i(f_{12}(s))\|_2 + \sum_{k=1}^{4} \|\sigma_k(f_{12}(g(t))) - \sigma_k(f_{12}(s))\|_2$$

wherein s represents a training style image; $f_{12}(s)$ represents a three dimensional matrix formed by the plurality of second training style feature maps; $f_{12}(g(t))$ represents a three dimensional matrix formed by the plurality of first training style feature maps; $\mu_k(f_{12}(g(t)))$ represents a three dimensional matrix formed by average values of the plurality of first training style feature maps; $\mu_k(f_{12}(s))$ represent a three dimensional matrix formed by average values of the plurality of second training style feature maps; $\sigma_k(f_{12}(g(t)))$ represents a three dimensional matrix formed by variance values of the plurality of first training style feature maps; $\sigma_k(f_{12}(s))$ represents a three dimensional matrix formed by variance values of the plurality of second training style feature maps; k is an integer.

In one example, the plurality of first training style feature maps includes a first group of first training style feature maps output from the ReLu1_1-th layer of the VGG16 network, a second group of first training style feature maps output from the ReLu2_1-th layer of the VGG16 network, a third group of first training style feature maps output from the ReLu3_1-th layer of the VGG16 network, and a fourth group of first training style feature maps output from the ReLu4_1-th layer of the VGG16 network. In another example, the plurality of second training style feature maps includes a first group of second training style feature maps output from the ReLu1_1-th layer of the VGG16 network, a second group of second training style feature maps output from the ReLu2_1-th layer of the VGG16 network, a third group of second training style feature maps output from the ReLu3_1-th layer of the VGG16 network, and a fourth group of second training style feature maps output from the ReLu4_1-th layer of the VGG16 network.

In some embodiments, when k=1, $\mu_1(f_{12}(g(t)))$ represents a three dimensional matrix formed by the average values of the first group of first training style feature maps, $\mu_1(f_{12}(s))$ represents a three dimensional matrix formed by the average values of the first group of second training style feature maps, $\sigma_1(f_{12}(g(t)))$ represents a three dimensional matrix formed by the variance values of the first group of first training style feature maps, $\sigma_1(f_{12}(s))$ represents a three dimensional matrix formed by the variance values of the first group of second training style feature maps.

In some embodiments, when k=2, $\mu_2(f_{12}(g(t)))$ represents a three dimensional matrix formed by the average values of the second group of first training style feature maps, $\mu_2(f_{12}(s))$ represents a three dimensional matrix formed by the average values of the second group of second training style feature maps, $\sigma_2(f_{12}(g(t)))$ represents a three dimensional matrix formed by the variance values of the second group of first training style feature maps, $\sigma_2(f_{12}(s))$ represents a three dimensional matrix formed by the variance values of the second group of second training style feature maps.

In some embodiments, when k=3, $\mu_3(f_{12}(g(t)))$ represents a three dimensional matrix formed by the average values of the third group of first training style feature maps, $\mu_3(f_{12}(s))$ represents a three dimensional matrix formed by the average values of the third group of second training style feature maps, $\sigma_3(f_{12}(g(t)))$ represents a three dimensional matrix formed by the variance values of the third group of first training style feature maps, $\sigma_3(f_{12}(s))$ represents a three dimensional matrix formed by the variance values of the third group of second training style feature maps.

In some embodiments, when k=4, $\mu_4(f_{12}(g(t)))$ represents a three dimensional matrix formed by the average values of the fourth group of first training style feature maps, $\mu_4(f_{12}(s))$ represents a three dimensional matrix formed by the average values of the fourth group of second training style feature maps, $\sigma_4(f_{12}(g(t)))$ represents a three dimensional matrix formed by the variance values of the fourth group of first training style feature maps, $\sigma_4(f_{12}(s))$ represents a three dimensional matrix formed by the variance values of the fourth group of second training style feature maps.

In some embodiments, the process of computing loss of the parameters of the decoder sub-network 103 includes computing the content loss of the parameters of the decoder sub-network 103 using the content loss function, based on the plurality of training content feature maps and the plurality of training output feature maps; and computing the style loss of the parameters of the decoder sub-network 103 using the style loss function, based on the plurality of first training style feature maps and the plurality of second training style feature maps.

In some embodiments, a first convolutional neural network includes a feature extraction sub-network, a morpher, and a first decoder sub-network. Optionally, the first decoder sub-network has a structure symmetric with a structure of the feature extraction sub-network. In some embodiments, a second convolutional neural network includes a feature extraction sub-network, a morpher, and a second decoder sub-network disclosed as the decoder sub-network herein.

In some embodiments, the number of parameters of the first decoder sub-network is 3505000, the number of parameters of the second decoder sub-network is 337000. The number of parameters of the second decoder sub-network is one tenth of the number of parameters of the first decoder sub-network. In a same condition, an amount of time spent on pre-training the first convolutional neural network is 7 hours, but an amount of time spent on pre-training the second convolutional neural network is 5 hours. For example, a same input image (having an 800×800 size) and a same style image (having a 256×256 size) are input in both the first convolutional neural network, and the second convolutional neural network. A processing time using the first convolutional neural network to process the input image and the style image for 100 times is 0.85 seconds. A processing time using the second convolutional neural network to process the input image and the style image for 100 times is 0.52 seconds. The second convolutional neural network using the decoder sub-network disclosed herein can improve the process efficiency, reduce the number of parameters, and shorten the pre-training process.

Figure 10:
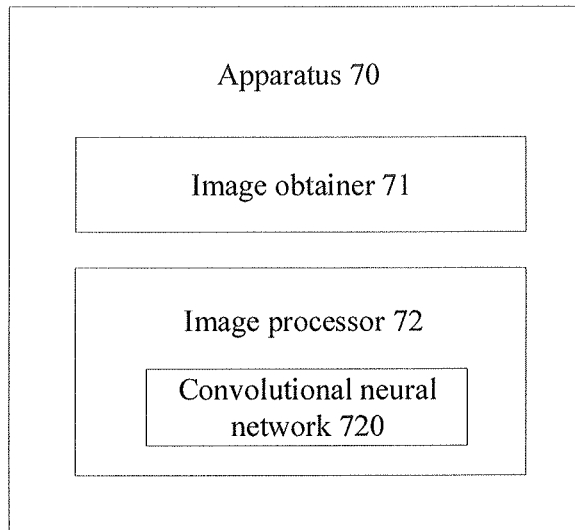
FIG. 10 is a schematic diagram of an apparatus for generating a composite image in some embodiments according to the present disclosure.

In another aspect, the present disclosure provides a first apparatus for generating a composite image. FIG. 10 is a schematic diagram of a first apparatus for generating a composite image in some embodiments according to the present disclosure. Referring to FIG. 10, the first apparatus 70 for generating a composite image includes an image obtainer 71, and an image processor 72. Optionally, the image obtainer 71 and the image processor 72 are connected with each other. For example, the image obtainer 71 and the image processor 72 are connected with each other using one or more integrated circuits.

In some embodiments, the image obtainer 71 is configured to obtain a style image and an input image. Optionally, the image obtainer 71 includes a memory. The memory stores the style image and the input image. Optionally, the image obtainer 71 includes a one or more cameras for obtaining the input image and the style image. Optionally, the image obtainer 71 is a combination of elements selected from a group consisting of hardware, software, and firmware.

In some embodiments, the image processor 72 includes a convolutional neural network 720. The convolutional neural network is configured to generate an output image including content features of the input image morphed with style features of a style image. Optionally, the convolutional neural network 720 includes a feature extraction sub-network, a morpher, and a decoder sub-network. The decoder sub-network includes an M numbers of densely connected computational modules, M is an integer ≥1. A respective one of the M numbers of densely connected computational modules includes an N numbers of convolutional blocks sequentially connected, N is an integer ≥2. Optionally, an n-th convolutional blocks of the N numbers of convolutional blocks in a respective one of the M numbers of densely connected computational modules is configured to receives and processes groups of output feature maps respectively from any previous convolutional blocks of the N numbers of convolutional blocks in the respective one of the M numbers of densely connected computational modules, to generate an n-th group of output feature maps, 2≤n≤N, and n is an integer. Optionally, an output from an m-th densely connected computational module of the M numbers of densely connected computational modules include N numbers of groups of output feature maps respectively from the N numbers of convolutional blocks of the m-th densely connected computational module, 1≤m≤M, and m is an integer.

In some embodiments, the image processor 71 is configured to extract style features of the style image to generate the plurality of style feature maps using the feature extraction sub-network 101; extract content features of the input image to generate the plurality of content feature maps using the feature extraction sub-network 101; morph the plurality of content feature maps respectively with the plurality of style feature maps to generate a plurality of output feature maps using the morpher, reconstruct the plurality of output feature maps through the decoder sub-network to generate the output image.

In some embodiments, the convolutional neural network 720 of the image processor 72 and the convolutional neural network in the computer-implemented method described herein has a same structure and same functions.

In some embodiments, the first apparatus 70 for generating a composite image includes a pre-training network. Optionally, the pre-training network includes a convolutional neural network 720, an analysis network, and a loss function. Optionally, the pre-training network is configured to pre-train the convolutional neural network 70.

Figure 11:
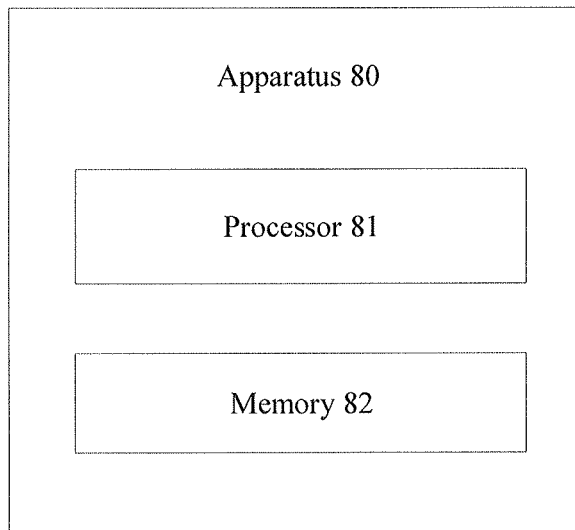
FIG. 11 is a schematic diagram of an apparatus for generating a composite image in some embodiments according to the present disclosure.

FIG. 11 is a schematic diagram of an apparatus for generating a composite image in some embodiments according to the present disclosure. Referring to FIG. 11, in some embodiments, the present disclosure provides a second apparatus 80 for generating a composite image. The second apparatus 80 for generating a composite image includes a memory 82, and one or more processors 81. Optionally, the memory 82 and the one or more processors 81 are connected with each other. In one example, the memory 82 and the one or more processors 81 are directly connected with each other. In another example, the memory 82 and the one or more processors 81 are indirectly connected with each other.

In some embodiments, the memory 82 and the one or more processors 81 are connected with each other through a network. Examples of networks suitable for connecting the memory 82 and the one or more processors 81 include, but are not limited to, a wireless network, a wired network, a combination of wireless networks and wired networks, a local network, an internet, a telecommunication network, an internet of things based on internet or telecommunication network. Optionally, the wired network can use twisted pairs, coaxial cables or optical fibers to transmit data. Optionally, the wireless network can use 3G/4G/5G mobile communication network, Bluetooth, Zigbee or WiFi to transmit data.

In some embodiments, the processor 81 is a device having abilities to process data and executing program, the device may be selected from a group consisting of CPU, TPU, and GPU. Optionally, the CPU can have a X86 structure or an ARM structure.

In some embodiments, the one or more memory 82 include a storage medium for storing one or more program instructions. Examples of appropriate storage media include, but are not limited to, a memory card of a smart phone, a storage component of a tablet computer, a hard disk of a personal computer, a read-only memory (ROM), an erasable programmable read only memory (EPROM), a compact disk read-only memory (CD-ROM), a USB memory, or any combination thereof.

Optionally, the memory stores computer-executable instructions for controlling the one or more processors to process an input image through a convolutional neural network to generate an output image comprising content features of the input image morphed with style features of a style image, wherein the convolutional neural network includes a feature extraction sub-network, a morpher, and a decoder sub-network.

Optionally, the memory stores computer-executable instructions for controlling the one or more processors to extract style features of the style image to generate a plurality of style feature maps using the feature extraction sub-network; extract content features of the input image to generate a plurality of content feature maps using the feature extraction sub-network; morph the plurality of content feature maps respectively with the plurality of style feature maps to generate a plurality of output feature maps using the morpher; and reconstruct the plurality of output feature maps through the decoder sub-network to generate the output image.

Optionally, to reconstruct the plurality of output feature maps through the decoder sub-network, the memory further stores computer-executable instructions for controlling the one or more processors to process the plurality of output feature maps through an M numbers of densely connected computational modules sequentially connected in the decoder sub-network, a respective one of the M numbers of densely connected computational modules comprising an N numbers of convolutional blocks sequentially connected, M being an integer $\geq 1$, N being an integer $\geq 2$.

Optionally, groups of output feature maps respectively from any previous convolutional blocks of the N numbers of convolutional blocks in the respective one of the M numbers of densely connected computational modules are input into an n-th convolutional blocks of the N numbers of convolutional blocks in the respective one of the M numbers of densely connected computational modules to generate an n-th group of output feature maps, $2 \leq n \leq N$.

Optionally, an output from an m-th densely connected computational module of the M numbers of densely connected computational modules includes N numbers of groups of output feature maps respectively from the N numbers of convolutional blocks of the m-th densely connected computational module, $1 \leq m \leq M$.

In some embodiments, decoder sub-network further includes a plurality of un-pooling blocks. Optionally, a respective one of the plurality of un-pooling blocks includes a convolutional layer, an active layer; and an un-pooling layer for performing an up-sampling operation.

In some embodiments, the feature extraction sub-network includes a plurality of pooling blocks respectively corresponding to the plurality of un-pooling blocks of the decoder sub-network.

In some embodiments, the decoder sub-network further includes an output layer. Optionally, the M numbers of densely connected computational modules includes a first densely connected computational module, a second densely connected computational module, and a third densely connected computational module. Optionally, the plurality of un-pooling blocks includes a first un-pooling block, a second un-pooling block, and a third un-pooling block.

Optionally, to reconstruct the plurality of output feature maps through the decoder sub-network, the memory further stores computer-executable instructions for controlling the one or more processors to process the plurality of output feature maps through the first un-pooling block to generate a plurality of first un-pooling feature maps, extract features of the plurality of first un-pooling feature maps using the first densely connected computational module to generate a plurality of first intermediate decoded feature maps; process the plurality of first intermediate decoded feature maps through the second un-pooling block to generate a plurality of second un-pooling feature maps; extract features of the plurality of second un-pooling feature maps using the second densely connected computational module to generate a plurality of second intermediate decoded feature maps; process the plurality of second intermediate decoded feature maps through the third un-pooling block to generate a plurality of third un-pooling feature maps; extract features of the plurality of third un-pooling feature maps using the third densely connected computational module to generate a plurality of third intermediate decoded feature maps; and convert the plurality of third intermediate decoded feature maps from a feature space into an image space using the output layer, thereby generating the output image.

In some embodiments, the feature extraction sub-network includes a first convolutional layer group, a second convolutional layer group, a third convolutional layer group, a fourth convolutional layer group, a first pooling layer, a second pooling layer, and a third pooling layer; the first pooling layer is between the first convolutional layer group and the second convolutional layer group; the second pooling layer is between the second convolutional layer group and the third convolutional layer group; and the third pooling layer is between the third convolutional layer group and the fourth convolutional layer group.

In some embodiments, the first convolutional layer group includes two convolutional layers and two active layers. Optionally, the second convolutional layer group includes two convolutional layers and two active layers. Optionally, the third convolutional layer group includes three convolutional layers and three active layers. Optionally, the fourth convolutional layer group includes one convolutional layer and one active layer.

In some embodiments, to extract style features of the style image to generate the plurality of style feature maps using the feature extraction sub-network, the memory further stores computer-executable instructions for controlling the one or more processors to extract style features of the style image using the first convolutional layer group to generate a plurality of first intermediate style feature maps; down-sample the plurality of first intermediate style feature maps using the first pooling layer to generate a plurality of first pooling style feature maps; extract style features of the plurality of first pooling style feature maps using the second convolutional layer group to generate a plurality of second intermediate style feature maps; down-sample the plurality of second intermediate style feature maps using the second pooling layer to generate a plurality of second pooling style feature maps; extract style features of the plurality of second pooling style feature maps using the third convolutional layer group to generate a plurality of third intermediate style feature maps; down-sample the plurality of third intermediate style feature maps using the third pooling layer to generate a plurality of third pooling style feature maps; and extract style features of the plurality of third pooling style feature maps using the fourth convolutional layer group to generate a plurality of fourth intermediate style feature maps. Optionally, the plurality of style feature maps include the plurality of fourth intermediate style feature maps.

In some embodiments, to extract content features of the input image to generate the plurality of content feature maps using the feature extraction sub-network, the memory further stores computer-executable instructions for controlling the one or more processors to extract content features of the input image using the first convolutional layer group to generate a plurality of first intermediate content feature maps; down-sample the plurality of first intermediate content feature maps using the first pooling layer to generate a plurality of first pooling content feature maps; extract content features of the plurality of first pooling content feature maps using the second convolutional layer group to generate a plurality of second intermediate content feature maps; down-sample the plurality of second intermediate content feature maps using the second pooling layer to generate a plurality of second pooling content feature maps; extract content features of the plurality of second pooling content feature maps using the third convolutional layer group to generate a plurality of third intermediate content feature maps; down-sample the plurality of third intermediate content feature maps using the third pooling layer to generate a plurality of third pooling content feature maps; and extract content features of the plurality of third pooling content feature maps using the fourth convolutional layer group to generate a plurality of fourth intermediate content feature maps. Optionally, the plurality of content feature maps include the plurality of fourth intermediate content feature maps.

Optionally, the plurality of output feature maps are expressed as:

$$A(x, y) = \sigma(y) \cdot \left(\frac{x - \mu(x)}{\sigma(x)}\right) + \mu(y)$$

wherein A(x, y) represents a three dimensional matrix formed by the plurality of output feature maps; x represents a three dimensional matrix formed by the plurality of content feature maps; y represents a three dimensional matrix formed by the plurality of style feature maps; μ(x) represents a three dimensional matrix constituted by a plurality of average values respectively derived from the plurality of content feature maps; σ(x) represents a three dimensional matrix formed by variance values of the plurality of content feature maps; μ(y) represents a three dimensional matrix constituted by a plurality of average values respectively derived from the plurality of style feature maps; σ(y) represents a three dimensional matrix constituted by a plurality of variance values respectively derived from the plurality of style feature maps.

In some embodiments, the memory further stores computer-executable instructions for controlling the one or more processors to pre-train the convolutional neural network. Optionally, to pre-train the convolutional neural network, the memory further stores computer-executable instructions for controlling the one or more processors to input a training content image and a training style image into the convolutional neural network; generate a plurality of training output images using the decoder sub-network and generating a plurality of training output feature maps using the morpher; extract style features and content features of the plurality of training output images using an analysis network to generate a plurality of first training style feature maps and a plurality of training content feature maps; extract style feature of the training style image using the analysis network to generate a plurality of second training style feature maps; compute loss of parameters of the decoder sub-network using a loss function, based on the plurality of first training style feature maps, the plurality of second training style feature maps, the plurality of training content feature maps, and the plurality of training output feature maps; and tune the parameters of the decoder sub-network based on the loss.

In some embodiments, the memory further stores computer-executable instructions for controlling the one or more processors to reiterate pre-training the convolutional neural network.

Optionally, the loss function include a content loss function and a style loss function. Optionally, the loss includes a content loss and a style loss.

In some embodiments, to computing loss of the parameters of the decoder sub-network, the memory further stores computer-executable instructions for controlling the one or more processors to compute the content loss of the parameters of the decoder sub-network using the content loss function, based on the plurality of training content feature maps and the plurality of training output feature maps; and compute the style loss of the parameters of the decoder sub-network using the style loss function, based on the plurality of first training style feature maps and the plurality of second training style feature maps.

Optionally, the loss function is expressed as:

$$L_t = \alpha \cdot L_c + \beta \cdot L_s;$$

wherein Lc represents the content loss function; Ls represents the style loss function; a represents a weight of the content loss function; β represents a weight of the style loss function.

Optionally, the content loss function Lc is expressed as:

$$L_c = \frac{1}{2 \times C1} \times \|f_{11}(g(t)) - f_2(t)\|_2;$$

wherein t represents the training content image; g(t) represents the plurality of training output images; $f_{11}(g(t))$ represents a three dimensional matrix formed by the plurality of training content feature maps; $f_2(t)$ represents a three dimensional matrix formed by the plurality of training output feature maps; and C is a constant used to perform normalization.

Optionally, the style loss function Ls is expressed as:

$$L_s = \sum_{k=1}^{4} \|\mu_k(f_{12}(g(t))) - \mu_i(f_{12}(s))\|_2 + \sum_{k=1}^{4} \|\sigma_k(f_{12}(g(t))) - \sigma_k(f_{12}(s))\|_2;$$

wherein s represents a training style image; $f_{12}(s)$ represents a three dimensional matrix formed by the plurality of second training style feature maps; $f_{12}(g(t))$ represents a three dimensional matrix formed by the plurality of first training style feature maps; $\mu_k(f_{12}(g(t)))$ represents a three dimensional matrix formed by average values of the plurality of first training style feature maps; $\mu_k(f_{12}(s))$ represent a three dimensional matrix formed by average values of the plurality of second training style feature maps; $\sigma_k(f_{12}(g(t)))$ represents a three dimensional matrix formed by variance values of the plurality of first training style feature maps; $\sigma_k(f_{12}(s))$ represents a three dimensional matrix formed by variance values of the plurality of second training style feature maps; k is an integer.

Optionally, the analysis network and the feature extraction sub-network includes a same structure and same parameters.

In another aspect, the present disclosure also provides a computer-program product. In some embodiments, the computer-program product includes a non-transitory tangible computer-readable medium having computer-readable instructions thereon. Optionally, the computer-readable instructions are executable by a processor to cause the processor to process an input image through the convolutional neural network to generate an output image including content features of the input image morphed with style features of a style image. Optionally, the convolutional neural network includes a feature extraction sub-network, a morpher, and a decoder sub-network.

In some embodiments, to processing the input image through the convolutional neural network, the computer-readable instructions are executable by a processor to cause the processor to extract style features of the style image to generate a plurality of style feature maps using the feature extraction sub-network; extract content features of the input image to generate a plurality of content feature maps using the feature extraction sub-network, morph the plurality of content feature maps respectively with the plurality of style feature maps to generate a plurality of output feature maps using the morpher, and reconstruct the plurality of output feature maps through the decoder sub-network to generate the output image.

In some embodiments, to reconstruct the plurality of output feature maps through the decoder sub-network, the computer-readable instructions are executable by a processor to cause the processor to process the plurality of output feature maps through an M numbers of densely connected computational modules sequentially connected in the decoder sub-network. Optionally, a respective one of the M numbers of densely connected computational modules comprising an N numbers of convolutional blocks sequentially connected, M being an integer ≥1, N being an integer ≥2. Optionally, groups of output feature maps respectively from any previous convolutional blocks of the N numbers of convolutional blocks in the respective one of the M numbers of densely connected computational modules are input into an n-th convolutional blocks of the N numbers of convolutional blocks in the respective one of the M numbers of densely connected computational modules to generate an n-th group of output feature maps, 2≤n≤N. Optionally, an output from an m-th densely connected computational module of the M numbers of densely connected computational modules includes N numbers of groups of output feature maps respectively from the N numbers of convolutional blocks of the m-th densely connected computational module, 1≤m≤M.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented method using a convolutional neural network, comprising processing an input image through the convolutional neural network to generate an output image comprising content features of the input image morphed with style features of a style image, wherein the convolutional neural network comprises a feature extraction sub-network, a morpher, and a decoder sub-network;

wherein processing the input image through the convolutional neural network comprises:

extracting style features of the style image to generate a plurality of style feature maps using the feature extraction sub-network;

extracting content features of the input image to generate a plurality of content feature maps using the feature extraction sub-network;

morphing the plurality of content feature maps respectively with the plurality of style feature maps to generate a plurality of output feature maps using the morpher; and reconstructing the plurality of output feature maps through the decoder sub-network to generate the output image;
wherein reconstructing the plurality of output feature maps through the decoder sub-network comprises processing the plurality of output feature maps through an M numbers of densely connected computational modules sequentially connected in the decoder sub-network, a respective one of the M numbers of densely connected computational modules comprising an N numbers of convolutional blocks sequentially connected, M being an integer ≥1, N being an integer ≥2;
groups of output feature maps respectively from any previous convolutional blocks of the N numbers of convolutional blocks in the respective one of the M numbers of densely connected computational modules are input into an n-th convolutional blocks of the N numbers of convolutional blocks in the respective one of the M numbers of densely connected computational modules to generate an n-th group of output feature maps, 2≤n≤N; and
an output from an m-th densely connected computational module of the M numbers of densely connected computational modules comprises N numbers of groups of output feature maps respectively from the N numbers of convolutional blocks of the m-th densely connected computational module, 1≤m≤M.

2. The method of claim 1, wherein a respective one of the N numbers of convolutional blocks comprises a convolutional layer and an active layer.

3. The method of claim 1, wherein the decoder sub-network further comprises a plurality of un-pooling blocks; and
a respective one of the plurality of un-pooling blocks comprises:
a convolutional layer;
an active layer; and
an un-pooling layer for performing an up-sampling operation.

4. The method of claim 3, wherein the feature extraction sub-network comprises a plurality of pooling blocks respectively corresponding to the plurality of un-pooling blocks of the decoder sub-network.

5. The method of claim 4, wherein the decoder sub-network further comprises an output layer;
the M numbers of densely connected computational modules comprise a first densely connected computational module, a second densely connected computational module, and a third densely connected computational module;
the plurality of un-pooling blocks comprises a first un-pooling block, a second un-pooling block, and a third un-pooling block;
wherein reconstructing the plurality of output feature maps through the decoder sub-network comprises:
processing the plurality of output feature maps through the first un-pooling block to generate a plurality of first un-pooling feature maps;
extracting features of the plurality of first un-pooling feature maps using the first densely connected computational module to generate a plurality of first intermediate decoded feature maps;
processing the plurality of first intermediate decoded feature maps through the second un-pooling block to generate a plurality of second un-pooling feature maps;
extracting features of the plurality of second un-pooling feature maps using the second densely connected computational module to generate a plurality of second intermediate decoded feature maps;
processing the plurality of second intermediate decoded feature maps through the third un-pooling block to generate a plurality of third un-pooling feature maps;
extracting features of the plurality of third un-pooling feature maps using the third densely connected computational module to generate a plurality of third intermediate decoded feature maps; and
converting the plurality of third intermediate decoded feature maps from a feature space into an image space using the output layer, thereby generating the output image.

6. The method of claim 1, wherein the feature extraction sub-network comprises a first convolutional layer group, a second convolutional layer group, a third convolutional layer group, a fourth convolutional layer group, a first pooling layer, a second pooling layer, and a third pooling layer;
the first pooling layer is between the first convolutional layer group and the second convolutional layer group;
the second pooling layer is between the second convolutional layer group and the third convolutional layer group; and
the third pooling layer is between the third convolutional layer group and the fourth convolutional layer group.

7. The method of claim 6, wherein the first convolutional layer group comprises two convolutional layers and two active layers;
the second convolutional layer group comprises two convolutional layers and two active layers;
the third convolutional layer group comprises three convolutional layers and three active layers; and
the fourth convolutional layer group comprises one convolutional layer and one active layer.

8. The method of claim 7, wherein extracting style features of the style image to generate the plurality of style feature maps using the feature extraction sub-network comprises:
extracting style features of the style image using the first convolutional layer group to generate a plurality of first intermediate style feature maps;
down-sampling the plurality of first intermediate style feature maps using the first pooling layer to generate a plurality of first pooling style feature maps;
extracting style features of the plurality of first pooling style feature maps using the second convolutional layer group to generate a plurality of second intermediate style feature maps;
down-sampling the plurality of second intermediate style feature maps using the second pooling layer to generate a plurality of second pooling style feature maps;
extracting style features of the plurality of second pooling style feature maps using the third convolutional layer group to generate a plurality of third intermediate style feature maps;
down-sampling the plurality of third intermediate style feature maps using the third pooling layer to generate a plurality of third pooling style feature maps; and
extracting style features of the plurality of third pooling style feature maps using the fourth convolutional layer group to generate a plurality of fourth intermediate style feature maps;
wherein the plurality of style feature maps comprise the plurality of fourth intermediate style feature maps.

9. The method of claim 7, wherein extracting content features of the input image to generate the plurality of content feature maps using the feature extraction sub-network comprises:
- extracting content features of the input image using the first convolutional layer group to generate a plurality of first intermediate content feature maps;
- down-sampling the plurality of first intermediate content feature maps using the first pooling layer to generate a plurality of first pooling content feature maps;
- extracting content features of the plurality of first pooling content feature maps using the second convolutional layer group to generate a plurality of second intermediate content feature maps;
- down-sampling the plurality of second intermediate content feature maps using the second pooling layer to generate a plurality of second pooling content feature maps;
- extracting content features of the plurality of second pooling content feature maps using the third convolutional layer group to generate a plurality of third intermediate content feature maps;
- down-sampling the plurality of third intermediate content feature maps using the third pooling layer to generate a plurality of third pooling content feature maps; and
- extracting content features of the plurality of third pooling content feature maps using the fourth convolutional layer group to generate a plurality of fourth intermediate content feature maps;
- wherein the plurality of content feature maps comprise the plurality of fourth intermediate content feature maps.

10. The method of claim 1, wherein the plurality of output feature maps are expressed as:

$$A(x, y) = \sigma(y) \cdot \left(\frac{x - \mu(x)}{\sigma(x)}\right) + \mu(y);$$

wherein [wherein A(x, y) represents a three dimensional matrix formed by the plurality of output feature maps; x represents a three dimensional matrix formed by the plurality of content feature maps; y represents a three dimensional matrix formed by the plurality of style feature maps; $\mu(x)$ represents a three dimensional matrix constituted by a plurality of average values respectively derived from the plurality of content feature maps; $\sigma(x)$ represents a three dimensional matrix constituted by a plurality of variance values respectively derived from the plurality of content feature maps; $\mu(y)$ represents a three dimensional matrix constituted by a plurality of average values respectively derived from the plurality of style feature maps; $\sigma(y)$ represents a three dimensional matrix constituted by a plurality of variance values respectively derived from the plurality of style feature maps.

11. The method of claim 1, further comprising pre-training the convolutional neural network;
wherein pre-training the convolutional neural network comprises:
- inputting a training content image and a training style image into the convolutional neural network;
- generating a plurality of training output images using the decoder sub-network and generating a plurality of training output feature maps using the morpher;
- extracting style features and content features of the plurality of training output images using an analysis network to generate a plurality of first training style feature maps and a plurality of training content feature maps;
- extracting style feature of the training style image using the analysis network to generate a plurality of second training style feature maps;
- computing loss of parameters of the decoder sub-network using a loss function, based on the plurality of first training style feature maps, the plurality of second training style feature maps, the plurality of training content feature maps, and the plurality of training output feature maps; and
- tuning the parameters of the decoder sub-network based on the loss.

12. The method of claim 11, further comprising reiterating pre-training the convolutional neural network.

13. The method of claim 11, wherein the loss function comprises a content loss function and a style loss function; the loss comprises a content loss and a style loss; and
computing loss of the parameters of the decoder sub-network comprises:
- computing the content loss of the parameters of the decoder sub-network using the content loss function, based on the plurality of training content feature maps and the plurality of training output feature maps; and
- computing the style loss of the parameters of the decoder sub-network using the style loss function, based on the plurality of first training style feature maps and the plurality of second training style feature maps.

14. The method of claim 13, wherein the loss function is expressed as:

$$L_t = \alpha \cdot L_c + \beta \cdot L_s;$$

wherein Lc represents the content loss function; Ls represents the style loss function; $\alpha$ represents a weight of the content loss function; $\beta$ represents a weight of the style loss function;

wherein the content loss function Lc is expressed as:

$$L_c = \frac{1}{2 \times C1} \times \|f_{11}(g(t)) - f_2(t)\|_2;$$

wherein t represents the training content image; g(t) represents the plurality of training output images; $f_{11}(g(t))$ represents a three dimensional matrix formed by the plurality of training content feature maps; $f_2(t)$ represents a three dimensional matrix formed by the plurality of training output feature maps; and C1 is a constant used to perform normalization;

wherein the style loss function Ls is expressed as:

$$L_s = \sum_{k=1}^{4} \|\mu_k(f_{12}(g(t))) - \mu_i(f_{12}(s))\|_2 + \sum_{k=1}^{4} \|\sigma_k(f_{12}(g(t))) - \sigma_k(f_{12}(s))\|_2;$$

wherein s represents a training style image; $f_{12}(s)$ represents a three dimensional matrix formed by the plurality of second training style feature maps; $f_{12}(g(t))$ represents a three dimensional matrix formed by the plurality of first training style feature maps; $\mu_k(f_{12}(g(t)))$ represents a three dimensional matrix formed by average values of the plurality of first training style feature maps; $\mu_k(f_{12}(s))$ represent a three dimensional matrix formed by average values of the plurality of second training style feature maps; $\sigma_k(f_{12}(g(t)))$ represents a three dimensional matrix formed by variance values of the plurality of first training style feature maps; $\sigma_k(f_{12}(s))$ represents a three dimensional matrix formed by variance values of the plurality of second training style feature maps; k is an integer.

15. The method of claim 11, wherein the analysis network and the feature extraction sub-network comprise a same structure and same parameters.

16. An apparatus for generating a composite image, comprising;
a memory;
one or more processors;
wherein the memory and the one or more processors are connected with each other; and
the memory stores computer-executable instructions for controlling the one or more processors to process an input image through a convolutional neural network to generate an output image comprising content features of the input image morphed with style features of a style image, wherein the convolutional neural network comprises a feature extraction sub-network, a morpher, and a decoder sub-network;
wherein the memory stores computer-executable instructions for controlling the one or more processors to:
extract style features of the style image to generate a plurality of style feature maps using the feature extraction sub-network;
extract content features of the input image to generate a plurality of content feature maps using the feature extraction sub-network;
morph the plurality of content feature maps respectively with the plurality of style feature maps to generate a plurality of output feature maps using the morpher; and
reconstruct the plurality of output feature maps through the decoder sub-network to generate the output image;
wherein, to reconstruct the plurality of output feature maps through the decoder sub-network, the memory further stores computer-executable instructions for controlling the one or more processors to:
process the plurality of output feature maps through an M numbers of densely connected computational modules sequentially connected in the decoder sub-network, a respective one of the M numbers of densely connected computational modules comprising an N numbers of convolutional blocks sequentially connected, M being an integer ≥1, N being an integer ≥2;
wherein groups of output feature maps respectively from any previous convolutional blocks of the N numbers of convolutional blocks in the respective one of the M numbers of densely connected computational modules are input into an n-th convolutional blocks of the N numbers of convolutional blocks in the respective one of the M numbers of densely connected computational modules to generate an n-th group of output feature maps, 2≤n≤N; and
an output from an m-th densely connected computational module of the M numbers of densely connected computational modules comprises N numbers of groups of output feature maps respectively from the N numbers of convolutional blocks of the m-th densely connected computational module, 1≤m≤M.

17. The apparatus of claim 16, wherein the decoder sub-network further comprises a plurality of un-pooling blocks; and
a respective one of the plurality of un-pooling blocks comprises:
a convolutional layer;
an active layer; and
an un-pooling layer for performing an up-sampling operation.

18. The apparatus of claim 17, wherein the feature extraction sub-network comprises a plurality of pooling blocks respectively corresponding to the plurality of un-pooling blocks of the decoder sub-network.

19. The apparatus of claim 18, wherein the decoder sub-network further comprises an output layer;
the M numbers of densely connected computational modules comprise a first densely connected computational module, a second densely connected computational module, and a third densely connected computational module;
the plurality of un-pooling blocks comprises a first un-pooling block, a second un-pooling block, and a third un-pooling block;
wherein reconstructing the plurality of output feature maps through the decoder sub-network comprises:
processing the plurality of output feature maps through the first un-pooling block to generate a plurality of first un-pooling feature maps;
extracting features of the plurality of first un-pooling feature maps using the first densely connected computational module to generate a plurality of first intermediate decoded feature maps;
processing the plurality of first intermediate decoded feature maps through the second un-pooling block to generate a plurality of second un-pooling feature maps;
extracting features of the plurality of second un-pooling feature maps using the second densely connected computational module to generate a plurality of second intermediate decoded feature maps;
processing the plurality of second intermediate decoded feature maps through the third un-pooling block to generate a plurality of third un-pooling feature maps;
extracting features of the plurality of third un-pooling feature maps using the third densely connected computational module to generate a plurality of third intermediate decoded feature maps; and
converting the plurality of third intermediate decoded feature maps from a feature space into an image space using the output layer, thereby generating the output image.

20. A computer-program product comprising a non-transitory tangible computer-readable medium having computer-readable instructions thereon, the computer-readable instructions being executable by a processor to cause the processor to process an input image through a convolutional neural network to generate an output image comprising content features of the input image morphed with style features of a style image, wherein the convolutional neural network comprises a feature extraction sub-network, a morpher, and a decoder sub-network;
wherein processing the input image through the convolutional neural network comprises:
extracting style features of the style image to generate a plurality of style feature maps using the feature extraction sub-network;
extracting content features of the input image to generate a plurality of content feature maps using the feature extraction sub-network;
morphing the plurality of content feature maps respectively with the plurality of style feature maps to generate a plurality of output feature maps using the morpher; and reconstructing the plurality of output feature maps through the decoder sub-network to generate the output image;

wherein reconstructing the plurality of output feature maps through the decoder sub-network comprises processing the plurality of output feature maps through an M numbers of densely connected computational modules sequentially connected in the decoder sub-network, a respective one of the M numbers of densely connected computational modules comprising an N numbers of convolutional blocks sequentially connected, M being an integer $\geq 1$, N being an integer $\geq 2$;

groups of output feature maps respectively from any previous convolutional blocks of the N numbers of convolutional blocks in the respective one of the M numbers of densely connected computational modules are input into an n-th convolutional blocks of the N numbers of convolutional blocks in the respective one of the M numbers of densely connected computational modules to generate an n-th group of output feature maps, $2 \leq n \leq N$; and an output from an m-th densely connected computational module of the M numbers of densely connected computational modules comprises N numbers of groups of output feature maps respectively from the N numbers of convolutional blocks of the m-th densely connected computational module, $1 \leq m \leq M$.

\* \* \* \* \*